(12) United States Patent
Rotem et al.

(10) Patent No.: US 11,029,744 B2
(45) Date of Patent: Jun. 8, 2021

(54) SYSTEM, APPARATUS AND METHOD FOR CONTROLLING A PROCESSOR BASED ON EFFECTIVE STRESS INFORMATION

(71) Applicant: Intel Corporation, Santa Clara, CA (US)

(72) Inventors: Efraim Rotem, Haifa (IL); Esfir Natanzon, Haifa (IL); Doron Rajwan, Rishon Le-Zion (IL); Eliezer Weissmann, Haifa (IL); Dorit Shapira, Atlit (IL); Lily P. Looi, Portland, OR (US); Bart Plackle, Diest (BE); Nadav Shulman, Tel Mond (IL)

(73) Assignee: Intel Corporation, Santa Clara, CA (US)

( * ) Notice: Subject to any disclaimer, the term of this patent is extended or adjusted under 35 U.S.C. 154(b) by 394 days.

(21) Appl. No.: 15/857,802

(22) Filed: Dec. 29, 2017

(65) Prior Publication Data

US 2019/0204893 A1   Jul. 4, 2019

(51) Int. Cl.
| | | |
|---|---|---|
| G06F 1/26 | (2006.01) | |
| G06F 1/32 | (2019.01) | |
| G06F 1/324 | (2019.01) | |
| G06F 1/20 | (2006.01) | |
| G06F 11/30 | (2006.01) | |
| G06F 1/3296 | (2019.01) | |
| G06F 1/3287 | (2019.01) | |
| G06F 1/3206 | (2019.01) | |

(52) U.S. Cl.
CPC ............. *G06F 1/324* (2013.01); *G06F 1/206* (2013.01); *G06F 1/3206* (2013.01); *G06F 1/3287* (2013.01); *G06F 1/3296* (2013.01); *G06F 11/3024* (2013.01); *G06F 11/3062* (2013.01); *G06F 1/26* (2013.01)

(58) Field of Classification Search
CPC ..................................... G06F 1/26; G06F 1/32
See application file for complete search history.

(56) References Cited

U.S. PATENT DOCUMENTS

| | | | | |
|---|---|---|---|---|
| 9,904,339 | B2 * | 2/2018 | Shapira | G06F 1/3206 |
| 9,959,042 | B2 * | 5/2018 | Adavi | G06F 3/06 |
| 10,303,257 | B2 * | 5/2019 | Hillis | B60Q 1/26 |

(Continued)

OTHER PUBLICATIONS

Intel Corporation, "Product Brief, Intel GO Autonomous Driving Solutions, Intel GO Autonomous Driving Solutions, Autonomous Driving, Accelerated," Nov. 2016, 6 pages.

*Primary Examiner* — Phil K Nguyen
(74) *Attorney, Agent, or Firm* — Trop, Pruner & Hu, P.C.

(57) ABSTRACT

In one embodiment, a processor includes: at least one core; a stress detector coupled to the at least one core to receive at least one of a voltage and a temperature at which the processor is to operate, calculate an effective stress based at least in part thereon, and maintain an accumulated effective stress; a clock circuit to calculate a lifetime duration of the processor in a platform; a meter to receive the accumulated effective stress, the lifetime duration and a stress model value and generate a control signal based on a comparison of the accumulated effective stress and the stress model value; and a power controller to control at least one parameter of a turbo mode of the processor based at least in part on the control signal. Other embodiments are described and claimed.

21 Claims, 22 Drawing Sheets

(56) References Cited

U.S. PATENT DOCUMENTS

| | | | | |
|---|---|---|---|---|
| 2013/0054179 A1* | 2/2013 | Shapira | ............... | G06F 11/3058 |
| | | | | 702/117 |
| 2013/0346774 A1* | 12/2013 | Bhandaru | ............. | G06F 1/3234 |
| | | | | 713/320 |
| 2015/0006971 A1* | 1/2015 | Shapira | ............... | G06F 11/3024 |
| | | | | 714/47.1 |
| 2015/0377955 A1* | 12/2015 | Shapira | ............... | G06F 11/3409 |
| | | | | 702/186 |
| 2016/0070321 A1 | 3/2016 | Shapira et al. | | |
| 2017/0052583 A1* | 2/2017 | Adavi | ....................... | G06F 3/06 |

* cited by examiner

US 11,029,744 B2

SYSTEM, APPARATUS AND METHOD FOR CONTROLLING A PROCESSOR BASED ON EFFECTIVE STRESS INFORMATION

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

Furthermore, integrated circuits that are used in adverse environments such as harsh thermal conditions and high availability can suffer from reliability issues. As a result, in many cases a designer of the integrated circuit limits its operating capabilities such as limiting operating frequency, even in instances in which actual use cases do not meet the worst case conditions.

DETAILED DESCRIPTION

Figure 1:
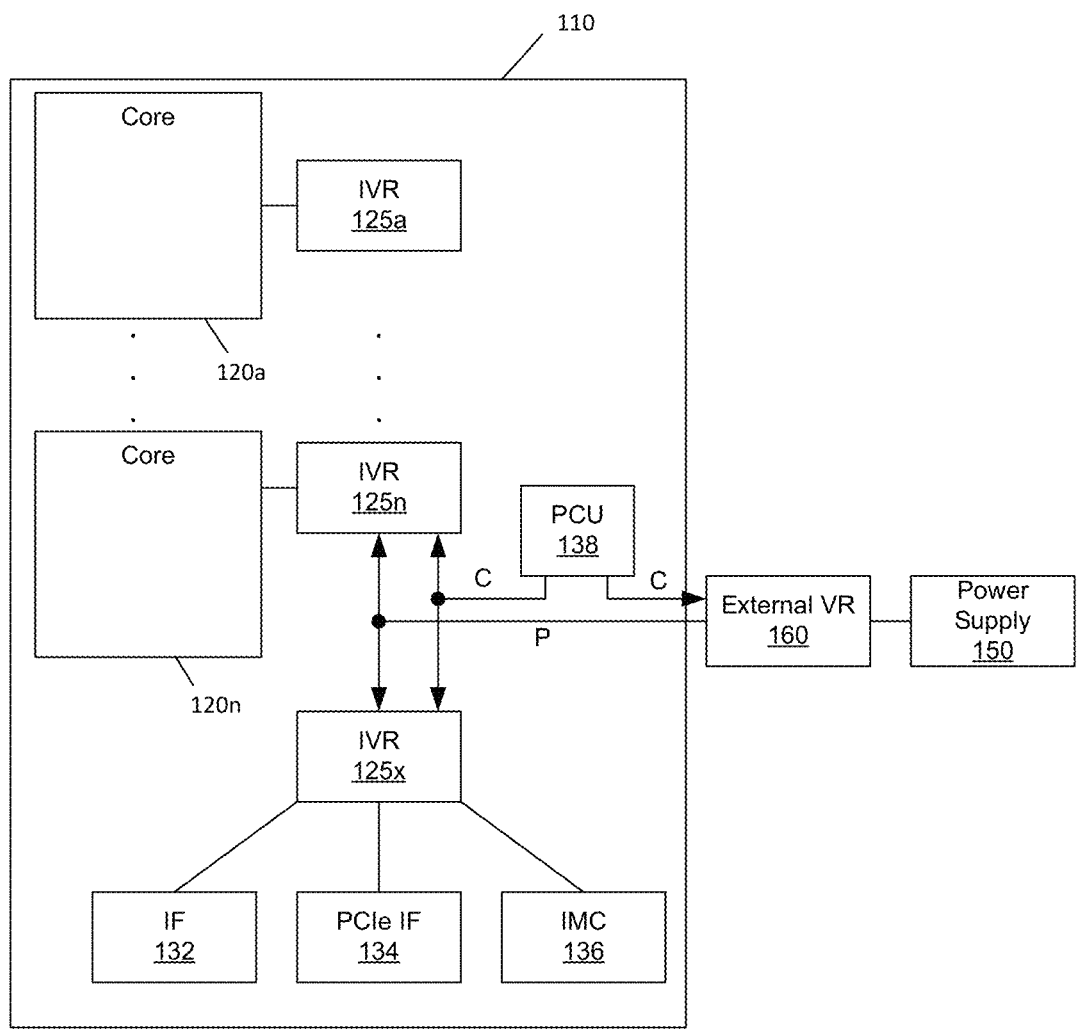
FIG. 1 is a block diagram of a portion of a system in accordance with an embodiment of the present invention.

Many processors, system on chips (SoCs) and other integrated circuits are being incorporated into Internet of Things (IoT) products. These IoT products are implemented across a wide spectrum of use cases. Many such products are incorporated into medical devices, vehicles, industrial equipment and so forth, which may have strict reliability requirements. Many of these devices also run continuously (e.g., 24/7 for extended lifetimes). In providing processors, SoCs and other integrated circuits for incorporation into such products, a manufacturer accounts for realistic worst case conditions and most aggressive users. As a result, there may be very little headroom for increased operating capabilities such as turbo modes. To this end, manufacturers may set maximum allowed operating parameters (such as frequency and voltage) lower than for conventional personal computer/server product usage cases.

Nevertheless in many actual use cases, the reality is that conditions may be less extreme than worst case assumptions that are used to set maximum operating capabilities. Using embodiments herein, reliability information of particular processors, SoCs and other devices as implemented into end products can be maintained dynamically. Furthermore, based at least in part upon on this information, during lifetime operation, one or more operating parameters can be dynamically controlled to operate at higher than the manufacturer-configured base values, which reflect worst case assumptions of extreme use cases.

In this way, when a particular product is identified as being implemented in a platform having less extreme use conditions, it is possible to dynamically enable increased operation, such as increased turbo mode operation, for at least some amount of lifetime of the product. In particular embodiments herein, a reliability odometer may be implemented into processors and SoCs to track actual effective stress of the device. Then based at least in part on this information, an increased turbo mode operation may be enabled, so long as the determined effective stress does not violate a predetermined stress model for the product. Such use cases are possible when it is determined that the actual use case is less than this predefined stress model (which may be configured for a worst case usage). This is particularly so as it is recognized that usage of a processor in extreme conditions may be time limited. Note that a stress model often accounts for variances of a population of units. For example, the lifetime stress of a unit is lower during winter when ambient temperature is low and higher during summer. Climate variances between geographical regions may vary as well. In one embodiment, a statistical average value may be used for some subset of parameters.

While embodiments herein are described with regard to dynamic control of turbo mode operation, understand the scope of the present invention is not limited in this regard. That is, in embodiments additional control techniques may be used to dynamically control operating parameters of a processor or other SoC based upon the reliability odometer information. As examples, a voltage guardband may be reduced, meaning that a processor may be controlled to operate within a closer margin or headroom to a maximum allowed voltage. Still further, stress headroom may be used to enable extended frequency range. Another use case option is to enable operation at extended temperature, namely in extreme ambient conditions for some amount of time.

Although embodiments described herein are with regard to processors such as multicore processors including multiple cores, system agent circuitry, cache memories, and one or more other processing units, understand the scope of the present invention is not limited in this regard and embodiments are applicable to other semiconductor devices such as chipsets, graphics chips, memories and so forth. Also, although embodiments described herein are with regard to control of voltage/frequency settings, stress monitoring and communication in accordance with an embodiment of the present invention can be used to control other device settings like maximum temperature, currents, and so forth, as well as to effect platform level control, and even affect future designs.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software). In addition, according to embodiments described herein, PCU 138 may base at least some power management and voltage and frequency control decisions on an effective stress on the processor, as determined by a stress detector of or associated with the PCU.

More specifically as described herein PCU 138 may determine an effective amount of stress that the processor has undergone over a given lifetime. When it is determined that this effective stress is less than a corresponding stress model value for that amount of lifetime, it is possible to dynamically control operating parameters of the processor based on this indication of available stress headroom which, in one embodiment may take the form of increased turbo mode capabilities.

While not shown for ease of illustration, understand that additional components may be present within processor 110 such as additional control circuitry, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
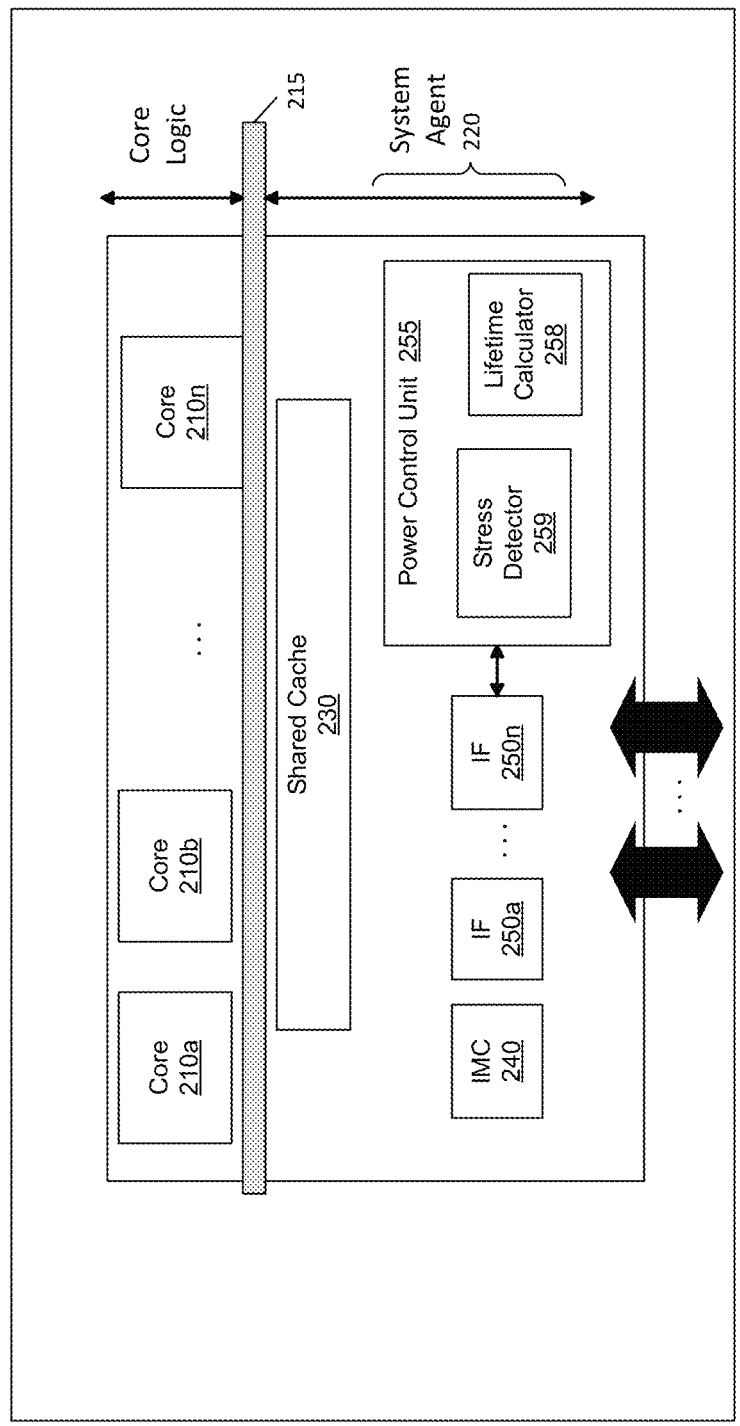
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent 220 that includes various components. As seen, system agent 220 may include a shared cache 230 which may be a last level cache. In addition, the system agent may include an integrated memory controller 240 to communicate with a system memory (not shown in FIG. 2), e.g., via a memory bus. System agent 220 also includes various interfaces 250 and a power control unit 255. In various embodiments, power control unit 255 may include a stress detector 259, which may be a logic to implement the effective stress analysis performed as described herein. Accordingly, stress detector 259 may receive an input of current operating parameters and update an accumulated effective stress level based on a calculation for the current stress that the processor is undergoing. As further shown, power control unit 255 further includes a lifetime calculator 258 which may calculate a current lifetime of the processor. Based on this analysis, PCU 255 may update one or more operating parameters of the processor. More specifically, PCU 255 may allow one or more cores 210 or other circuitry of processor 200 to operate at higher turbo mode frequencies and/or other parameters when it is determined that the accumulated effective stress is less than a corresponding stress model value for a given calculated lifetime of the processor, as described further herein.

In addition, by interfaces $250a$-$250n$, connection can be made to various off-chip components such as peripheral devices, mass storage and so forth. While shown with this particular implementation in the embodiment of FIG. 2, the scope of the present invention is not limited in this regard.

Figure 3:
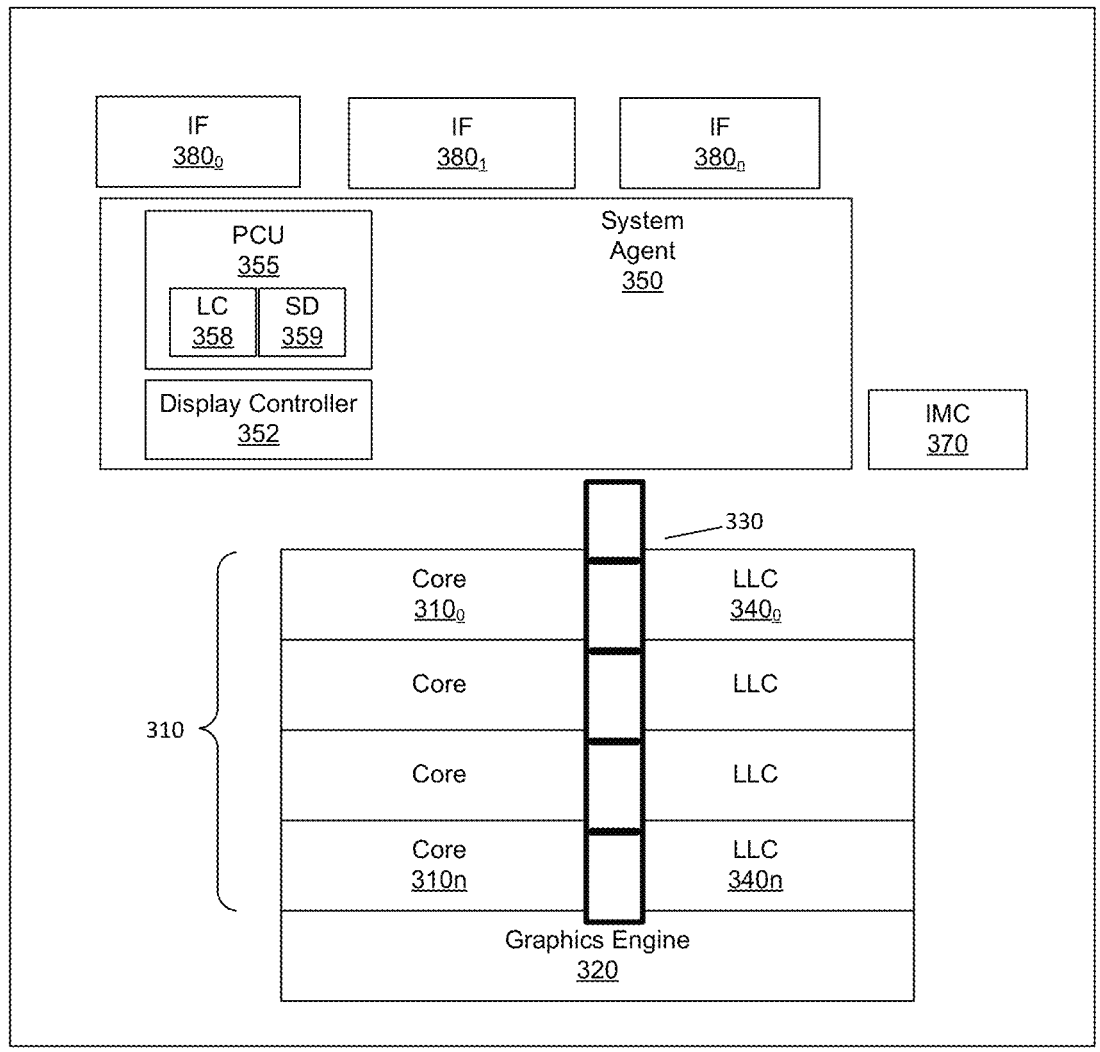
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include a stress detector 359, as described further herein. Also shown is an included lifetime calculator 358. Based at least in part on an accumulated effective stress level and a given calculated lifetime, power control unit 355 may dynamically control operating parameters of the processor when it is determined that there is available stress headroom.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 3, understand the scope of the present invention is not limited in this regard.

Figure 4:
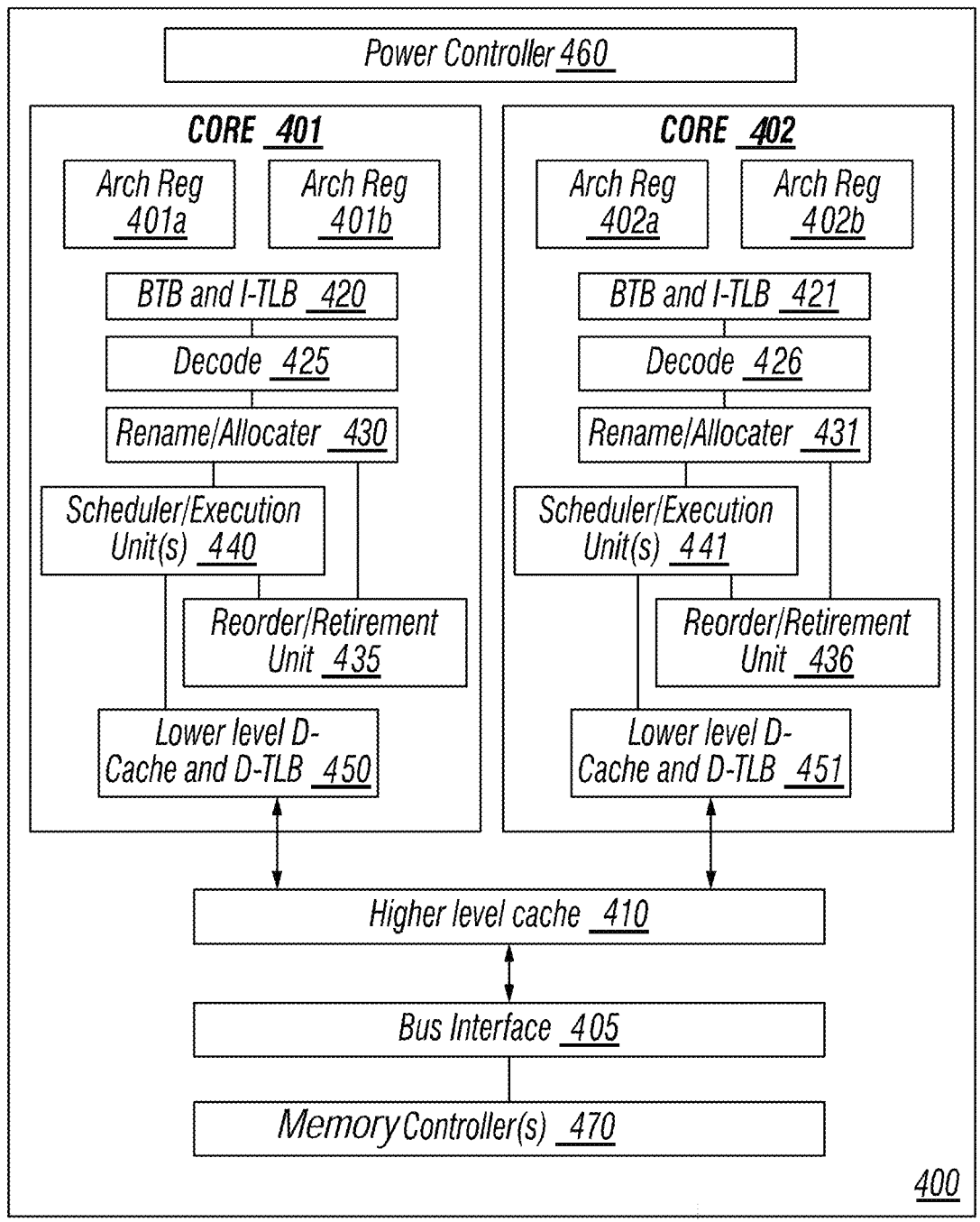
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
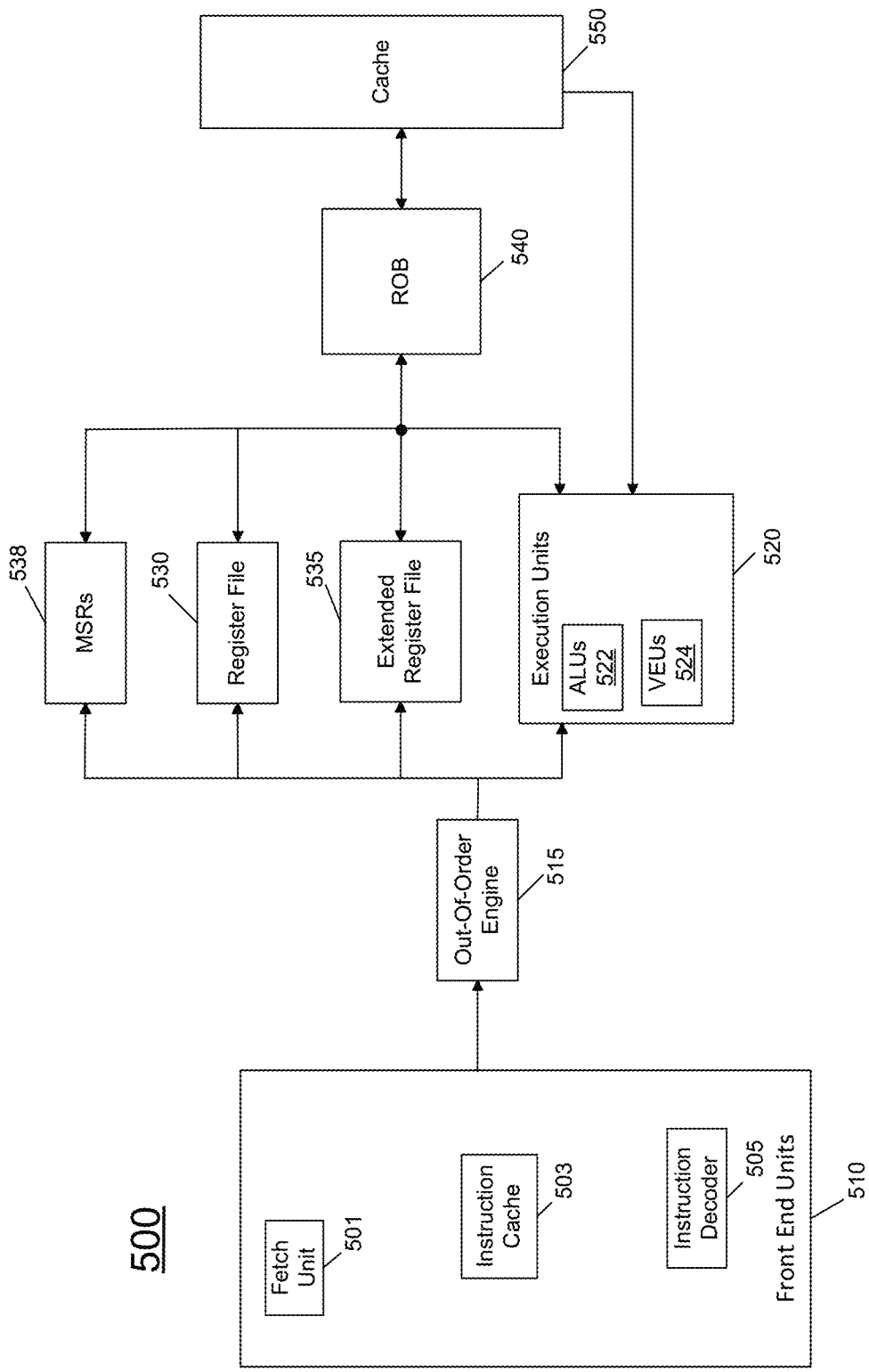
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
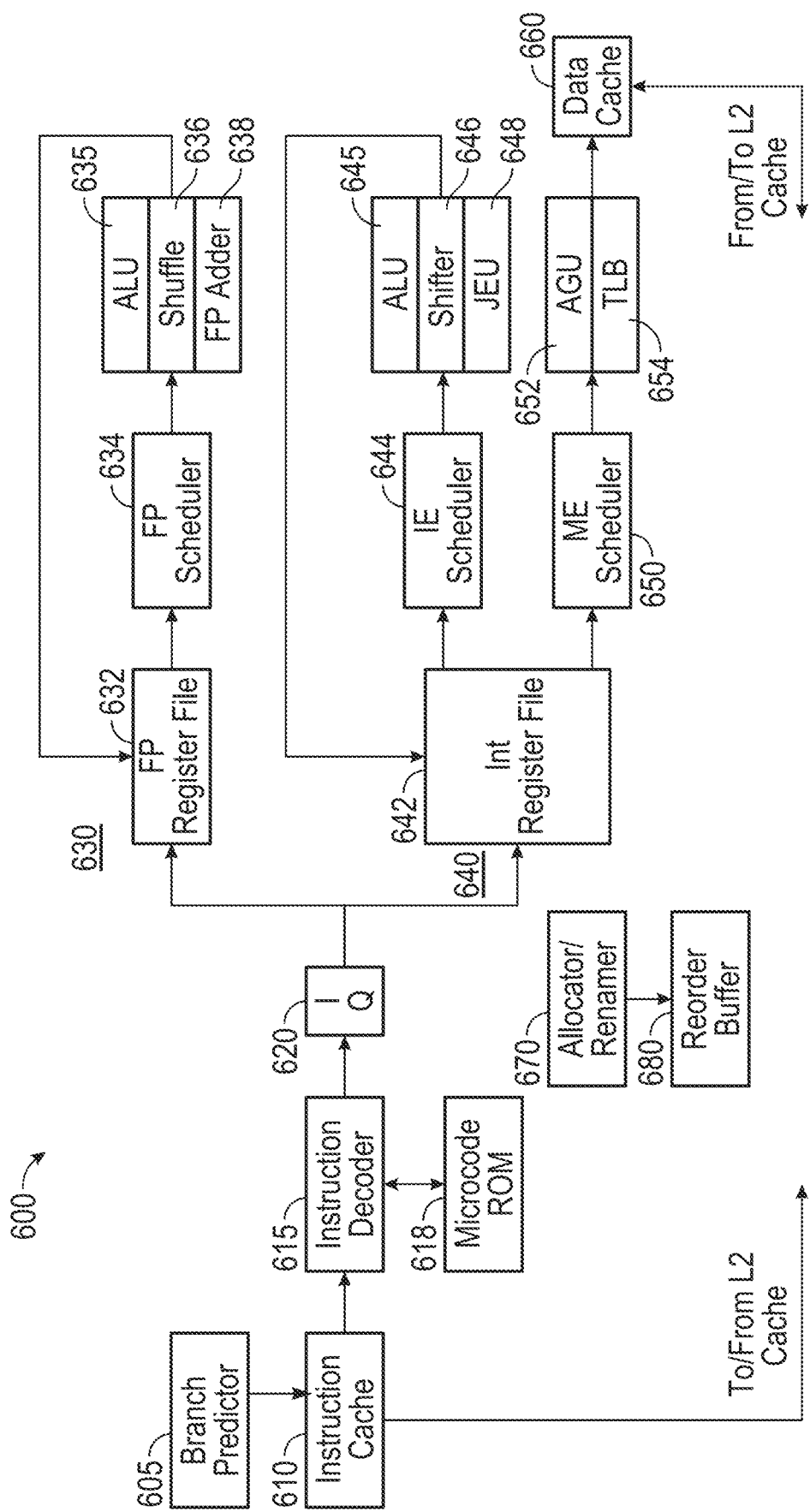
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
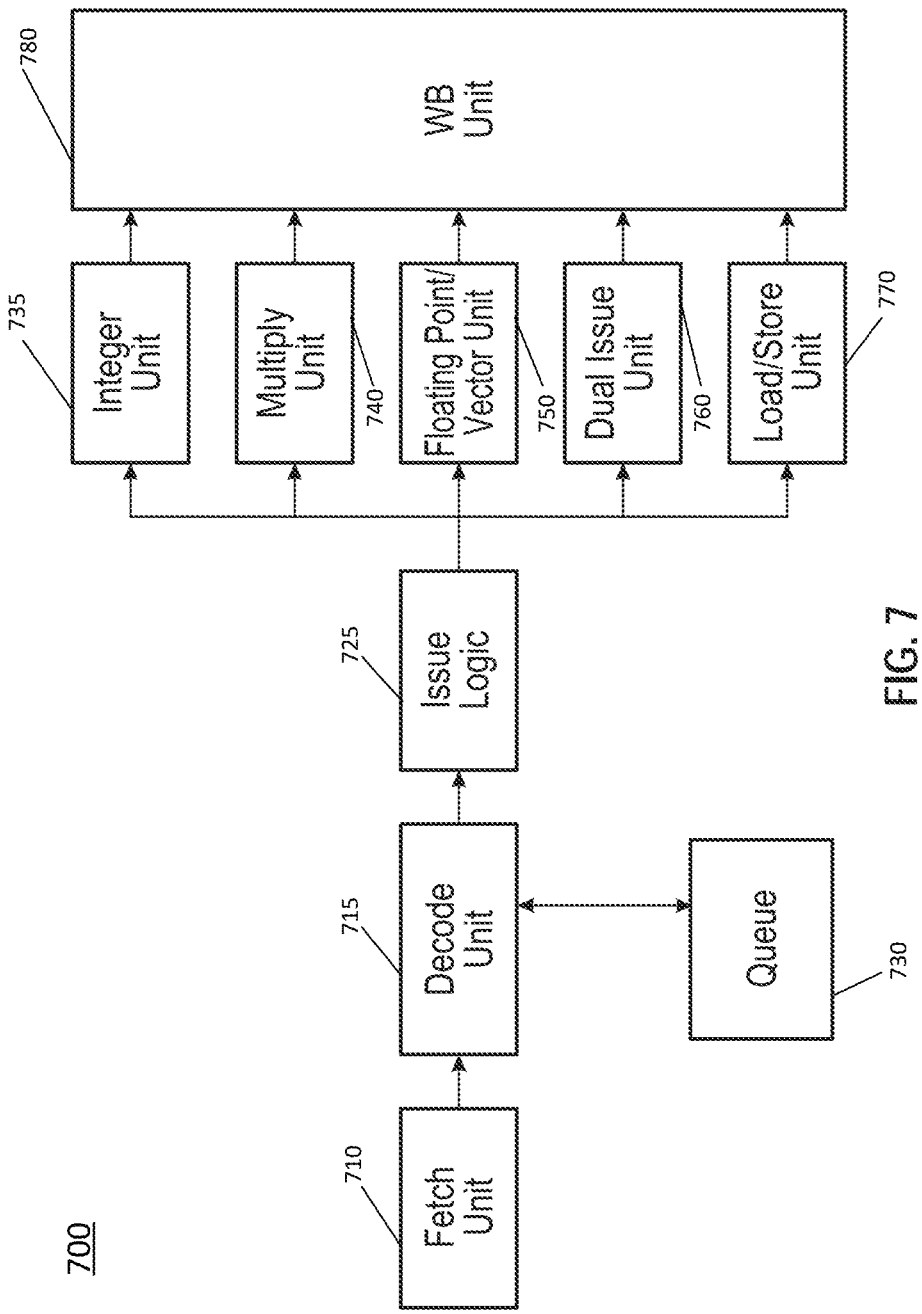
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
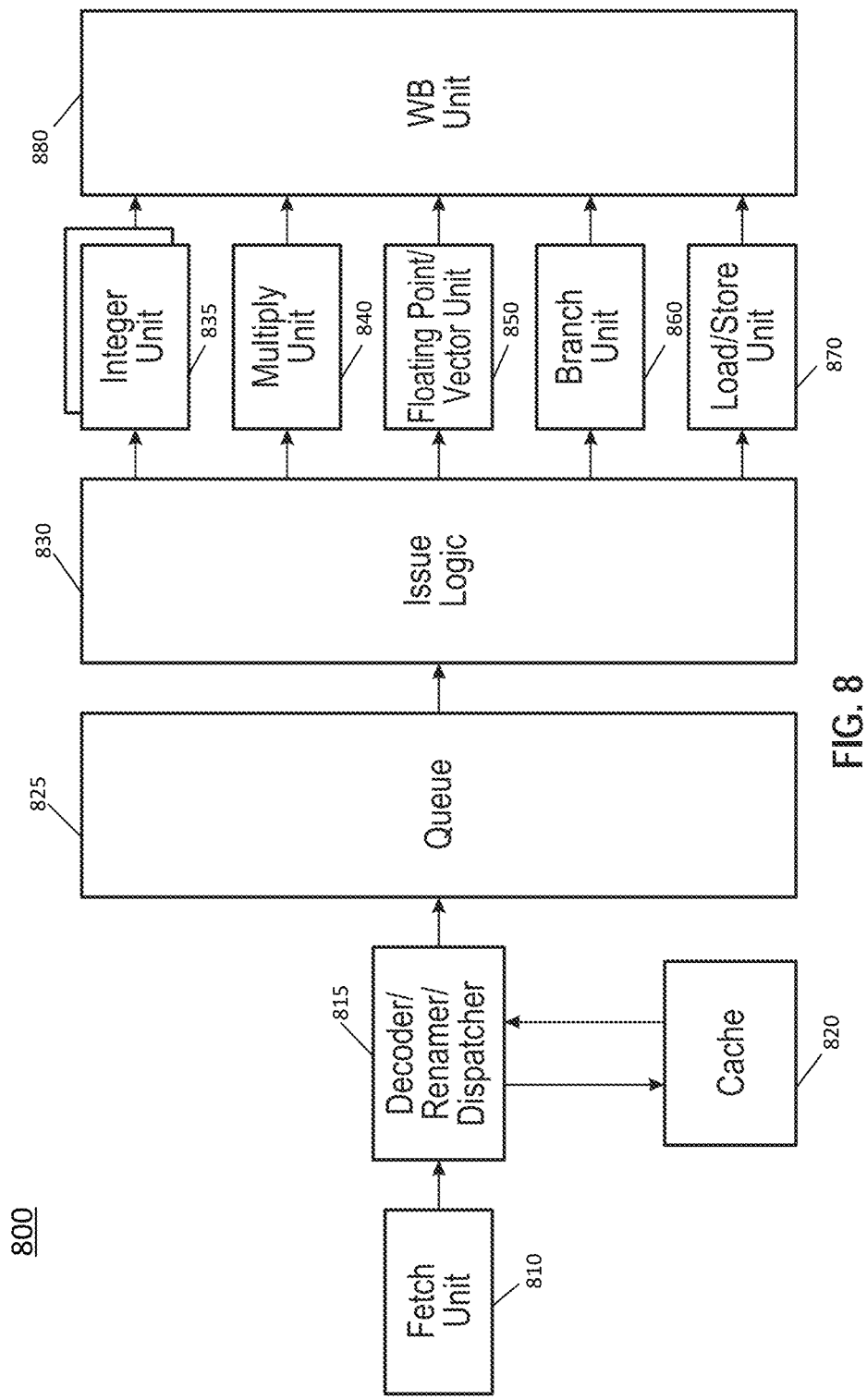
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
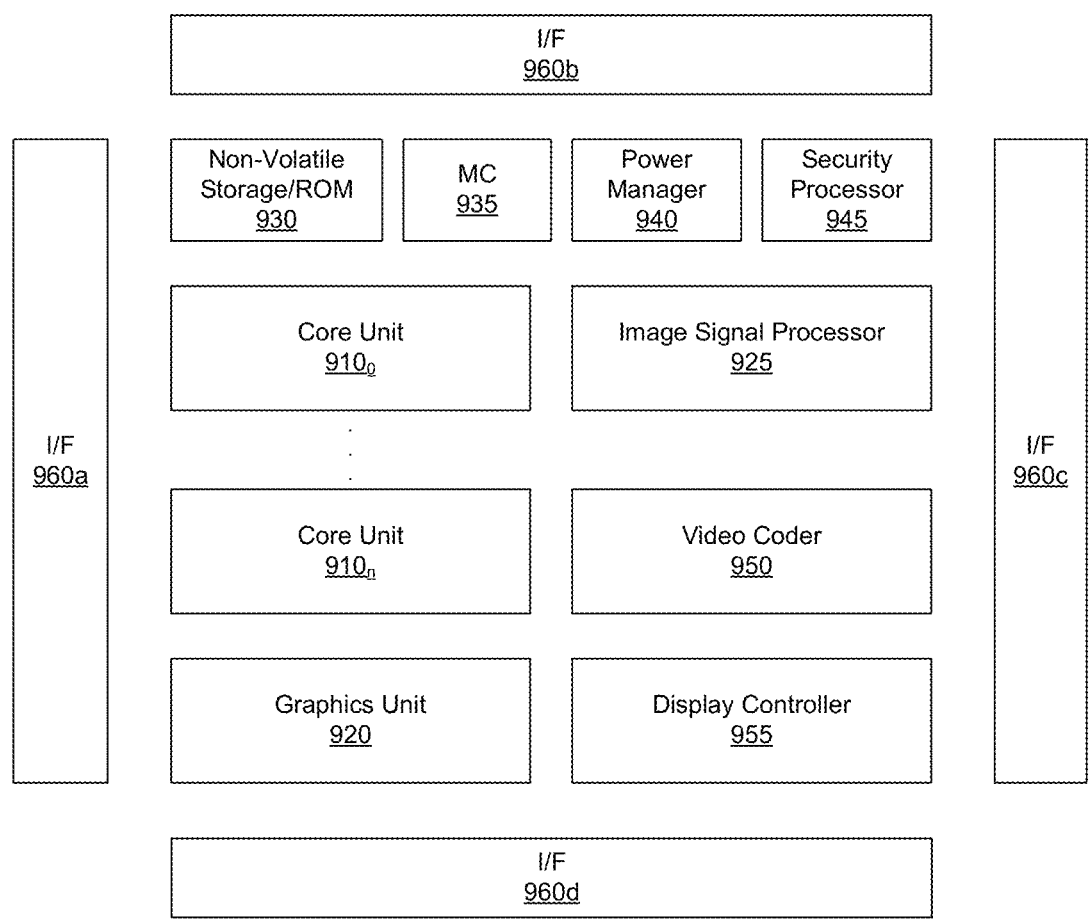
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management and stress detection and processor control techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be according to a variety of communication protocols such as PCIe™ GPIO, USB, $I_{2C}$, DART, MIPI, SDIO, DDR, SPI, HDMI, among other types of communication protocols. Although shown at this high level in the embodiment of FIG. 9, understand the scope of the present invention is not limited in this regard.

Figure 10:
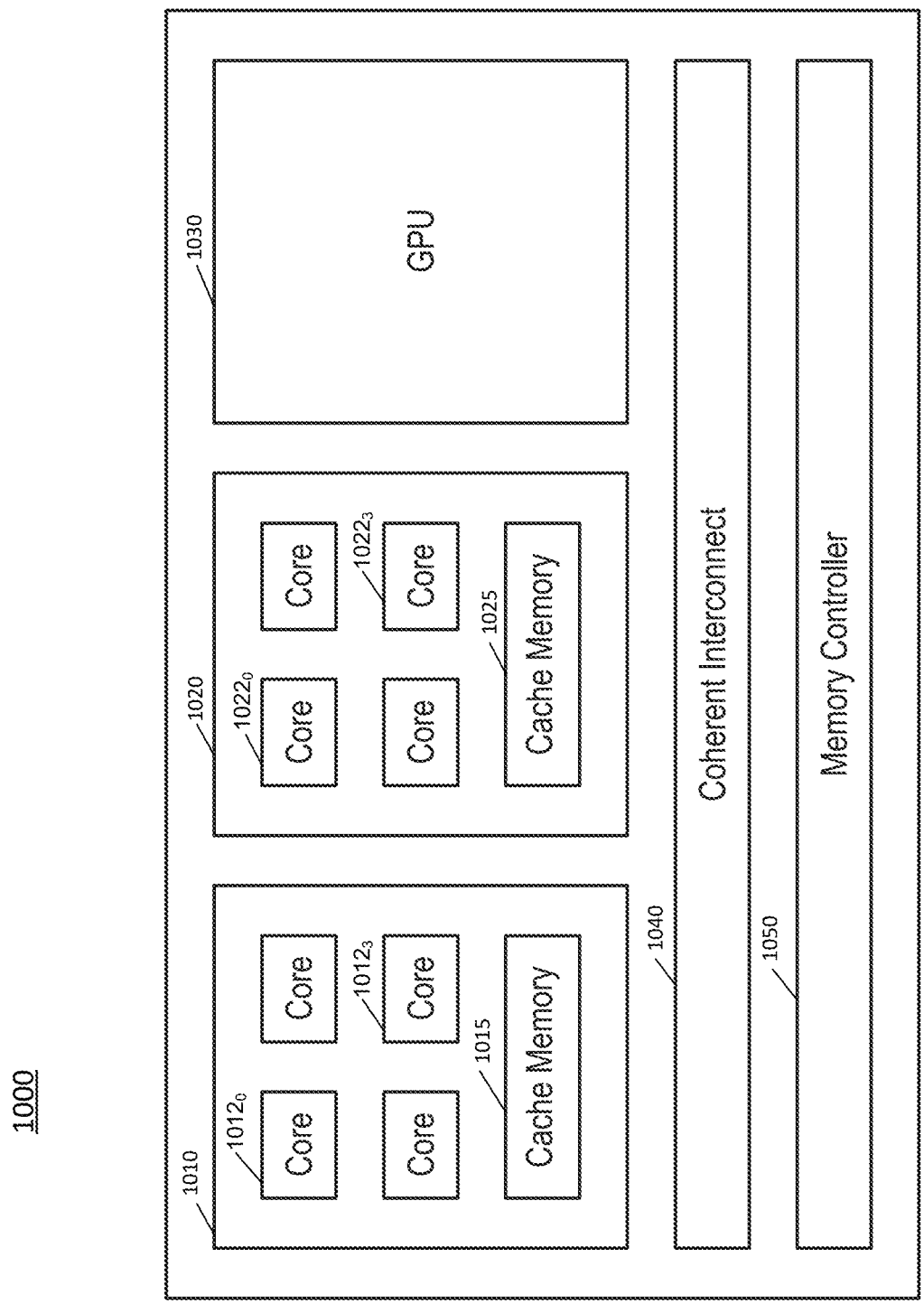
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
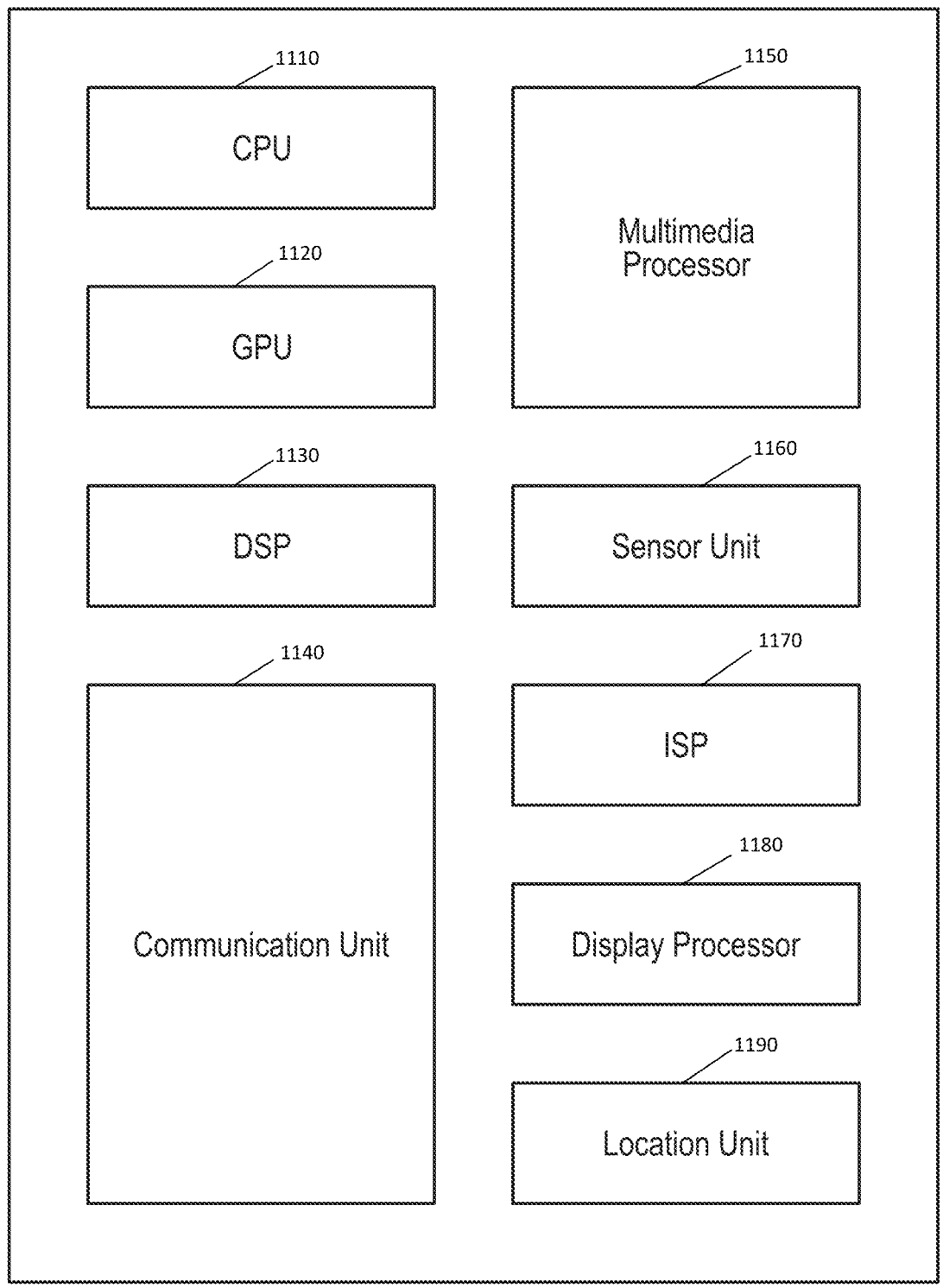
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area techniques such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
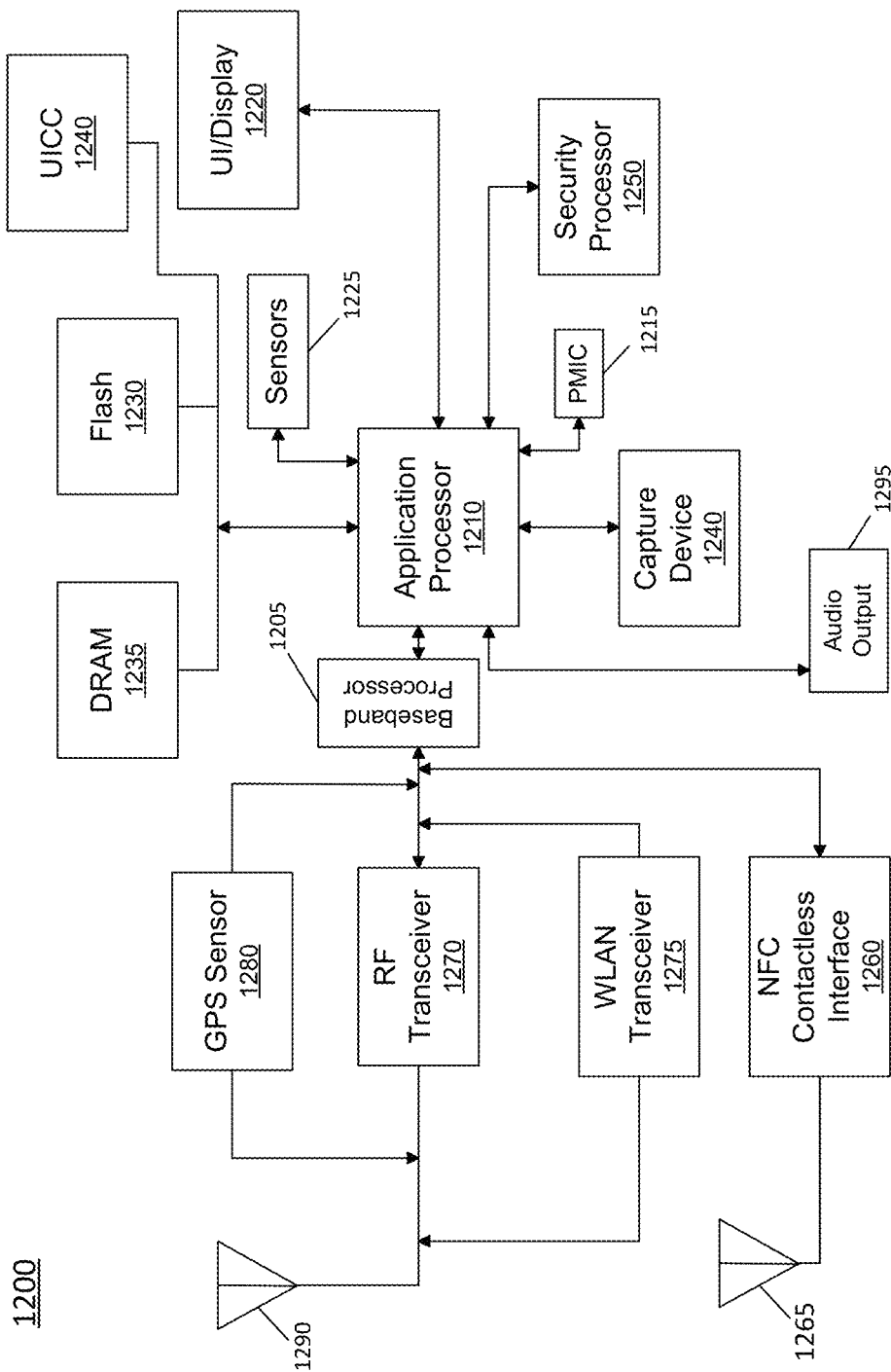
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. In some embodiments, stress detection may leverage at least certain of this information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200. In some embodiments, PMIC 1215 may control one or more components (including application processor 1210) responsive to effective stress information received from application processor 1210.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications, such as according to a Bluetooth™ standard or an IEEE 802.11 standard such as IEEE 802.11a/b/g/n can also be realized.

Figure 13:
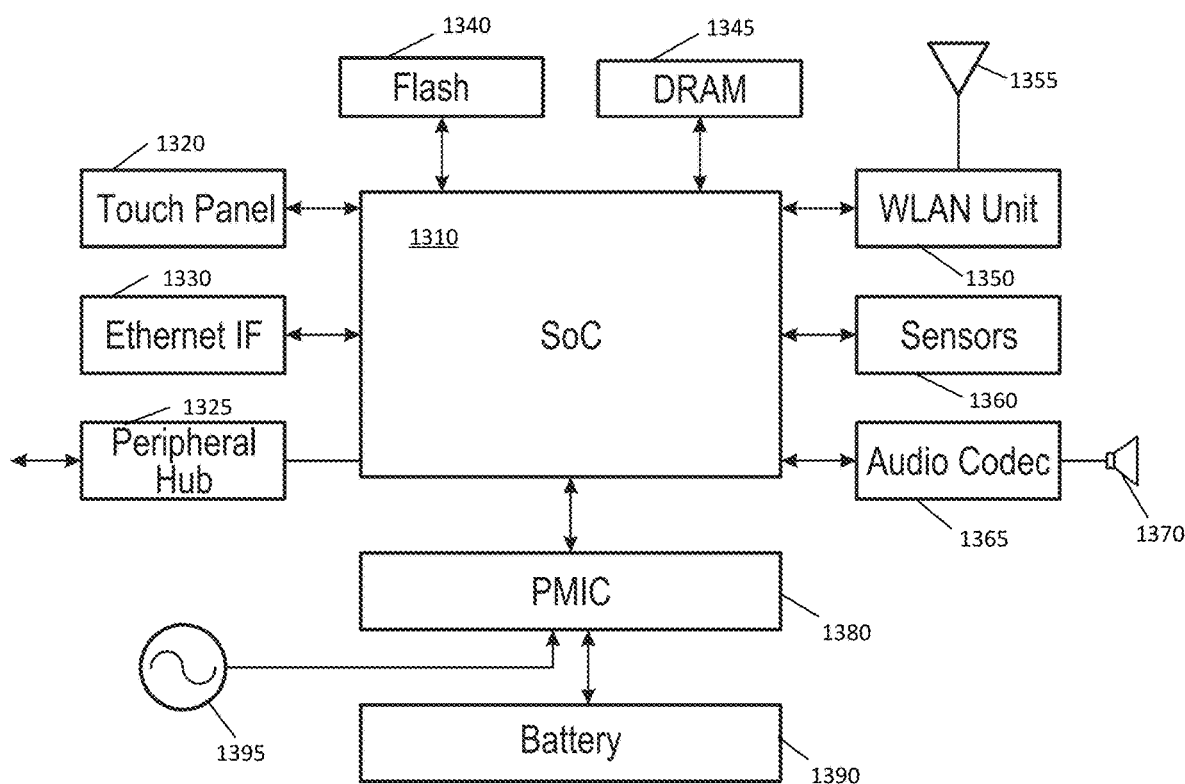
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental, usage and effective stress conditions, as described above. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
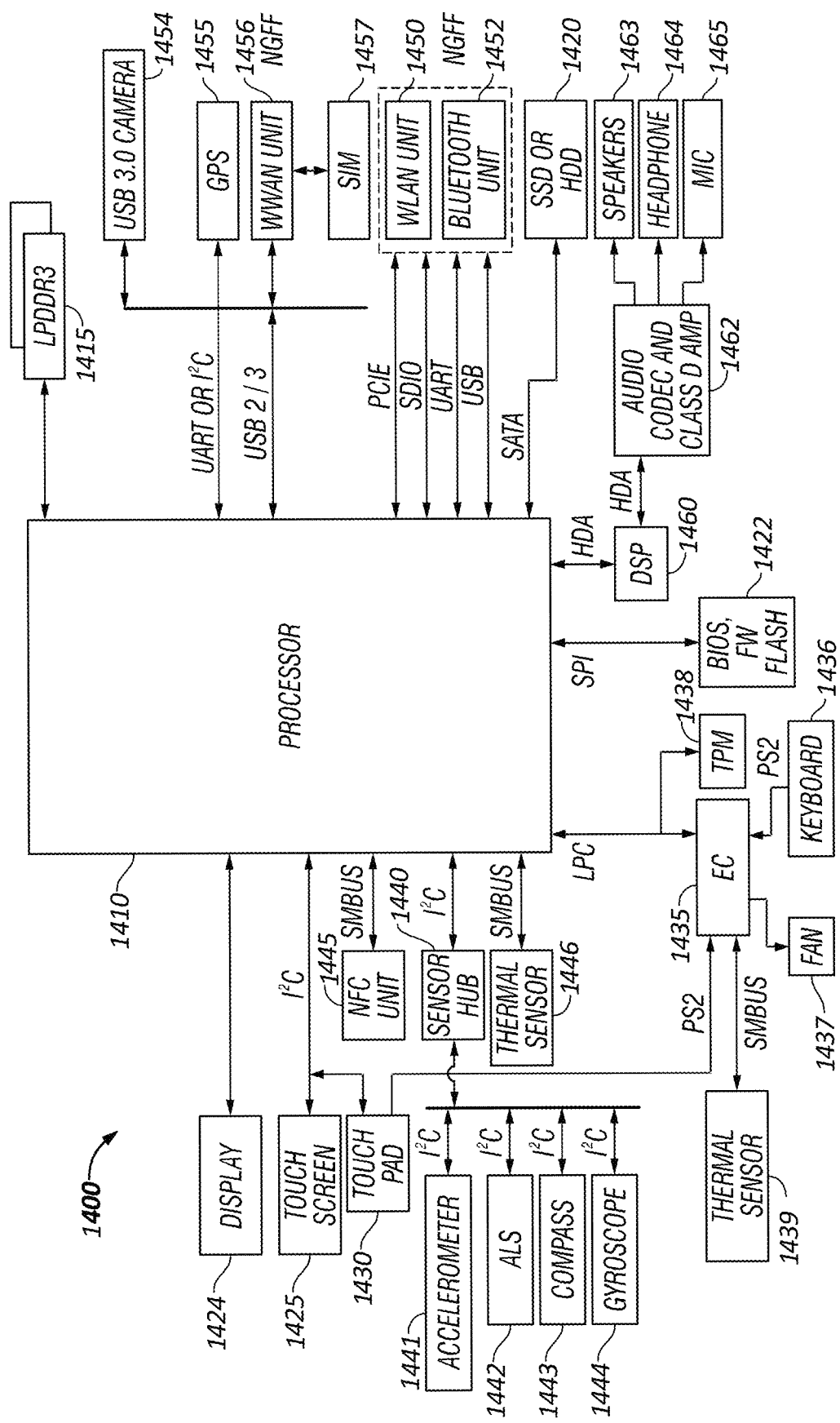
FIG. 14 is a block diagram of a representative computer system.

Referring now to FIG. 14, a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an $I^2C$ interconnect. As further shown in FIG. 14, in addition to touch screen 1425, user input by way of touch can also occur via a touch pad 1430 which may be configured within the chassis and may also be coupled to the same $I^2C$ interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I^2C$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to an embedded controller 1435 via a PS2 interface. In some embodiments, embedded controller 1435 may provide the storage for effective stress information as described herein. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications in accordance with a given IEEE 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a PCIe™ protocol or another such protocol such as a serial data input/output (SDIO) standard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given USB protocol such as a USB 2.0 or 3.0 link, or a UART or $I_2c$ protocol.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
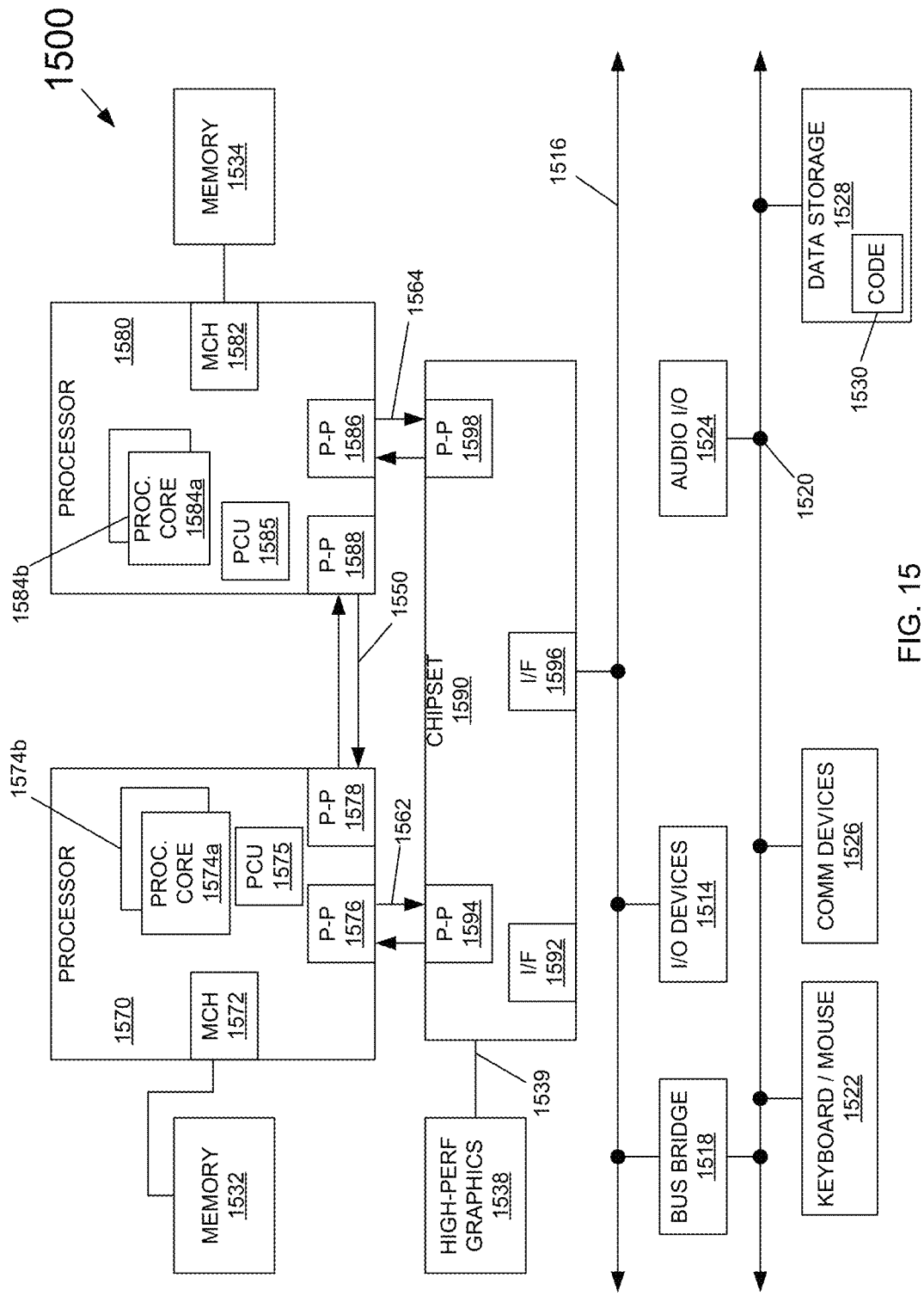
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a corresponding PCU 1575, 1585 to perform an effective stress analysis and control one or more operating parameters of the processor based at least in part thereon. More specifically, as described herein, PCU 1575, via its internal logic may determine an accumulated effective stress on processor 1570 and, based further on a calculated lifetime duration of processor 1570, identify that there is available stress headroom (as compared to a corresponding stress model value from a given stress model). In light of such determination of available stress headroom, PCU 1575 may enable processor 1572 to operate with increased operating parameters, such as increased turbo mode capabilities, as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
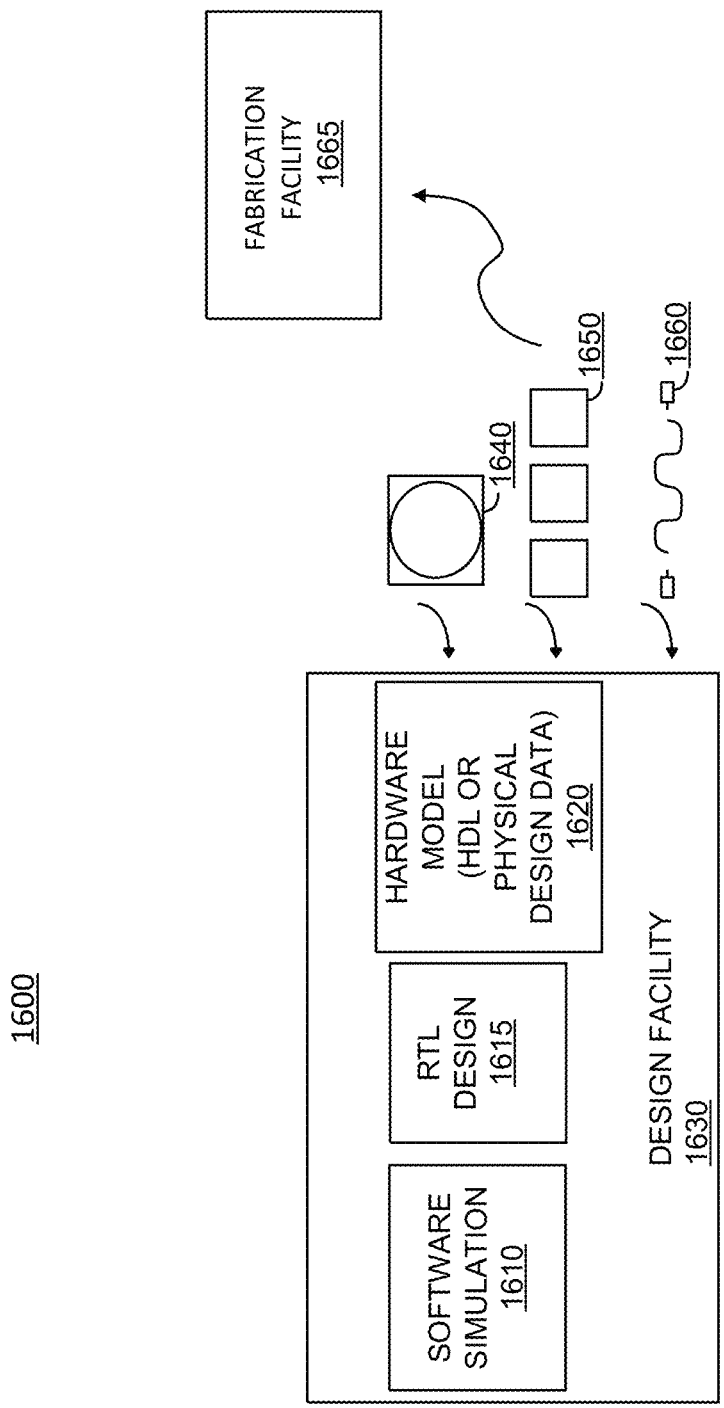
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, re-usable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
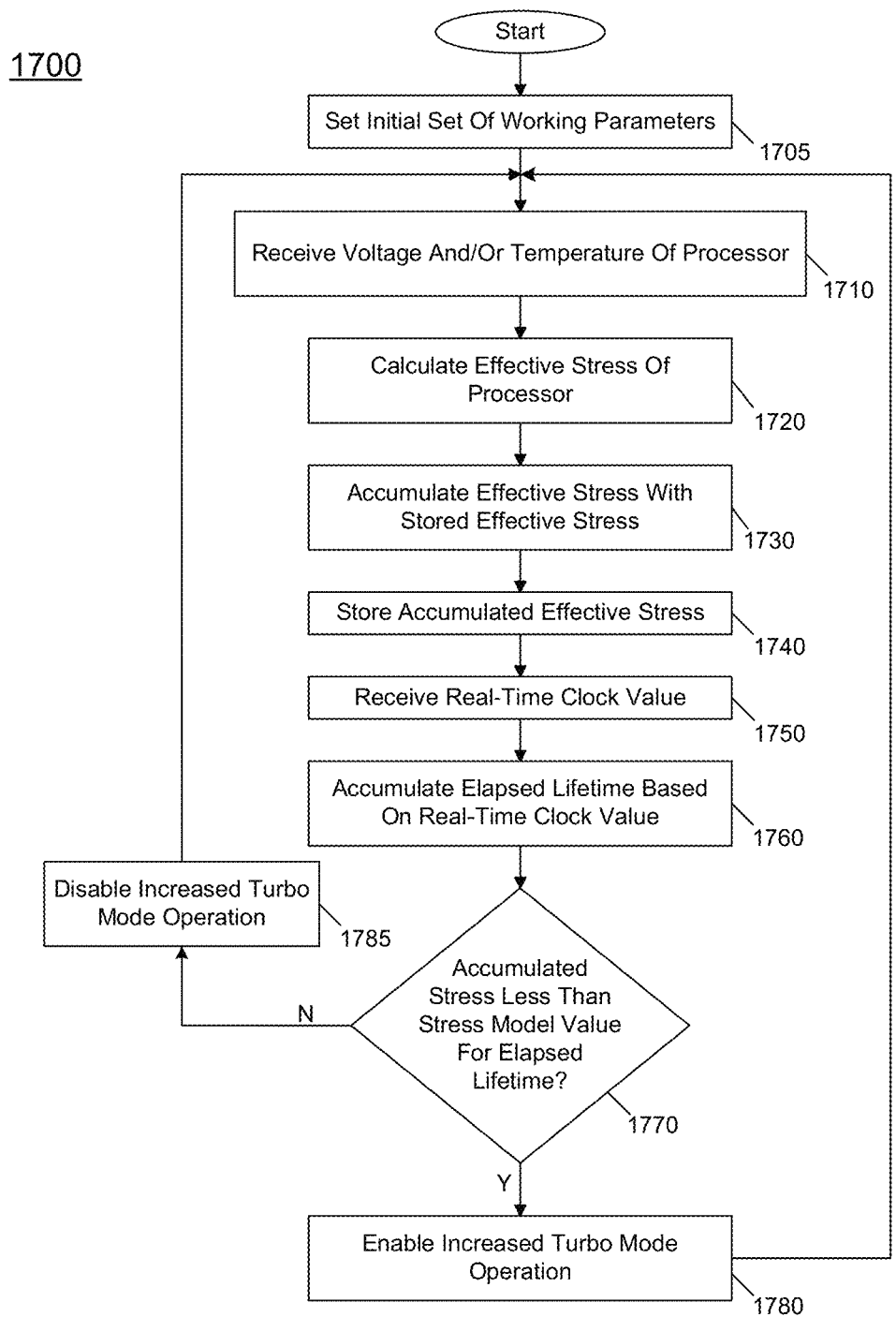
FIG. 17 is a flow diagram of a method in accordance with an embodiment of the present invention.

Referring now to FIG. 17, shown is a flow diagram of a method in accordance with an embodiment of the present invention. As shown in FIG. 17, method 1700 may be executed within a power control unit or other power controller, which may be implemented as a microcontroller, state machine or other hardware circuit of a processor, SoC or other semiconductor device. For purposes of illustration the discussion of FIG. 17 is in the context of a processor. Thus as seen at block 1705, an initial set of working parameters can be set at the beginning of lifetime for that part. These working parameters can be of various operating parameters, such as nominal voltage for a given operating frequency, temperature, maximum current ($I_{ccmax}$) and so forth. In addition, operating parameters for turbo mode control may be set. In embodiments, these turbo mode operating parameters may include one or more turbo mode frequencies (such as a set of so-called bin frequencies), one or more turbo mode voltages, turbo mode durations, temperature constraints, and so forth. These parameters may be set during manufacture of the device and stored, e.g., via fuses or non-volatile storage.

Control then passes to block 1710, which occurs during normal operation, where at least one of a current voltage and temperature of the processor may be received. As one such example, these parameters may be received within the power control unit. Although discussed with these two input parameters, understand the scope of the present invention is not limited in this aspect, and in other embodiments additional operating parameters such as acceleration factors, device loading, and transition time may also be received.

Method 1700 continues by calculating an effective stress of the processor (block 1720). More specifically, this effective stress may be calculated based on one or more of the received operating parameters. Different calculations can be performed based on the parameters received as well as the type of device and characterization information for the given type of device. Such calculations can be used to determine negative bias temperature instability (NBTI) degradation, gate oxide degradation (TDDB), and interconnect degradation, as examples. In one particular embodiment, the calculation of effective stress may take into account acceleration factors as a function of voltage and/or temperature. As an example, stored information regarding acceleration factors for voltage and/or temperature can be used to measure effective stress over a given time duration of operation.

Control next passes to block 1730 where the calculated effective stress can be accumulated with a stored effective stress, which may be stored in a non-volatile storage. This updated effective stress value thus includes the newly calculated effective stress and a sum of previously determined effective stress values, e.g., from a beginning of the lifetime of the processor. This updated effective stress value then can be stored (block 1740). As an example, this updated value can be stored back to the non-volatile storage from which the previously stored effective stress value was obtained. In other embodiments the non-volatile memory can be a computer storage such as hard disk, solid state drive, etc. Note that this accumulated effective stress value accounts for the actual usage (and non-usage) of the processor over the course of the lifetime of the device from its incorporation into a given platform until the platform is decommissioned, and thus represents an accumulated effective stress for a given lifetime duration. In another embodiment, the accumulation can be performed over some rolling average period of time (days, months etc.)

Still referring to FIG. 17, next control passes to block 1750 where a real-time clock value may be received. In an embodiment, a peripheral controller or other hardware circuit of a processor or other system component may maintain a real-time clock. In other embodiments, the real-time clock may be maintained via software. In any event, control next passes to block 1760 where an elapsed lifetime may be accumulated based on this real-time clock value. Note that this accumulated elapsed lifetime accounts for an entire lifetime that the processor or other semiconductor device has been incorporated into a platform in the field, and thus includes both actual time of operation of the processor and time in which the processor (and the platform in which the processor is included) is in a powered off or otherwise inactive state.

Control next passes to diamond 1770 where it is determined whether the accumulated effective stress value is less than a stress model value for the elapsed lifetime, obtained from a stress model. In an embodiment, the stress model value may be obtained using the elapsed lifetime, which thus acts as an index into the stress model. Note that this stress model may be a pre-defined stress model stored in a non-volatile storage of the processor or platform. In embodiments herein, this stress model may be implemented as a linear model of stress over time, such that the effective stress over the lifetime of the device increases linearly from a minimum value at the beginning of the lifetime to a maximum value at an anticipated end of lifetime (which may be expressed in a number of years, e.g. multiple decades). In other cases, the stress model may be non-linear. For example, a stress model may have a budget for infant mortality (e.g., for the first 6 months to 1 year) and then proceed linearly for the rest of the lifetime.

If it is determined that the accumulated stress is less than the stress model value, control passes to block 1780 where the processor may be enabled for increased turbo mode operation. Although the scope of the present invention is not limited in this regard, such increased turbo mode operation may include allowing turbo mode instances to occur at higher turbo mode frequencies (e.g., at one or more bin frequencies higher than allowed according to a base turbo mode frequency). Still further in some cases, increased turbo mode operation may include allowing turbo mode residency to be maintained for longer time durations than a configured turbo mode. Understand that other control may be performed to realize higher operational capabilities.

Note that in some cases, depending upon the amount that the accumulated maximum residency duration effective stress is lower than the stress model value for the indicated lifetime duration, increased turbo mode operation may be at potentially much higher frequencies. For example, depending upon an indicated excursion from the stress model value, increased turbo mode operation may be at multiple bin frequencies higher than a base turbo mode frequency, and/or time allowed in turbo mode may be increased. In embodiments, increased turbo mode operation may be enabled at least in part by updating parameter settings used in turbo mode operation. To this end, control signals, updated turbo mode parameters or so forth may be provided to a turbo mode controller to effect increased turbo mode operation. After this enabling, control passes to block 1710 for another loop iteration to again update the effective stress value and lifetime duration, e.g., according to a given schedule. In other cases, the above-discussed loop may be performed when a change of a given magnitude occurs to a measured temperature and/or operating voltage.

Instead if it is determined at diamond 1770 that the accumulated effective stress value in fact exceeds the relevant stress model value, control passes to block 1785 where increased turbo mode operation may be disabled. Although the scope of the present invention is not limited in this regard, this disabling of increased turbo mode operation may prevent turbo mode operation from occurring at higher frequencies than would otherwise be available. For example, turbo mode may be limited to a base turbo mode frequency such as one or a few bin values greater than a guaranteed operating frequency. In other cases, the disabling of increased turbo mode operation may include reducing an amount of time duration in which the processor is allowed to be resident in turbo mode. Still further, in some cases the turbo mode itself may be disabled or operation may revert to a baseline turbo mode frequency, e.g., 1-2 bins for a relatively short duration, e.g., 5% of the time. In any case, control thereafter passes from block 1785 to block 1710 where a further iteration can be performed.

Note that in some cases, information regarding the accumulated stress may be communicated from the system. For example, depending upon the level of accumulated stress, communication may be made to different entities. As examples, such communication may be with a consumer, such as an end user of the system, maintenance personnel or so forth. In yet other cases, communication may occur with a remote entity, such as a vehicle manufacturer, e.g. by way of a data center of the manufacturer that maintains a record for the particular vehicle. In this model, depending upon the effective stress indicated, the manufacturer may communicate with the vehicle owner, maintenance facility or so forth. In yet other cases, the vehicle manufacturer may use the effective stress information statistically, and may provide information as to this effective stress back to a manufacturer of the processor, in some cases.

Such communication may occur responsive to an accumulated effective stress level exceeding a corresponding stress model value for the indicated lifetime. Of course, in other situations the accumulated stress information may be communicated at different time occurrences, such as according to a periodic schedule, responsive to a request from the consumer, or so forth. Also understand that the communication of accumulated stress information may occur even when a given threshold is not exceeded. In addition to the accumulated stress information, other lifetime statistical information, which may be maintained within the PCU or other processor hardware, also may be communicated. For example, information regarding up time, and/or time in a turbo mode, or so forth may be maintained. Although shown with this particular implementation in the embodiment of FIG. 17, understand the scope of the present invention is not limited in this regard.

Figure 18:
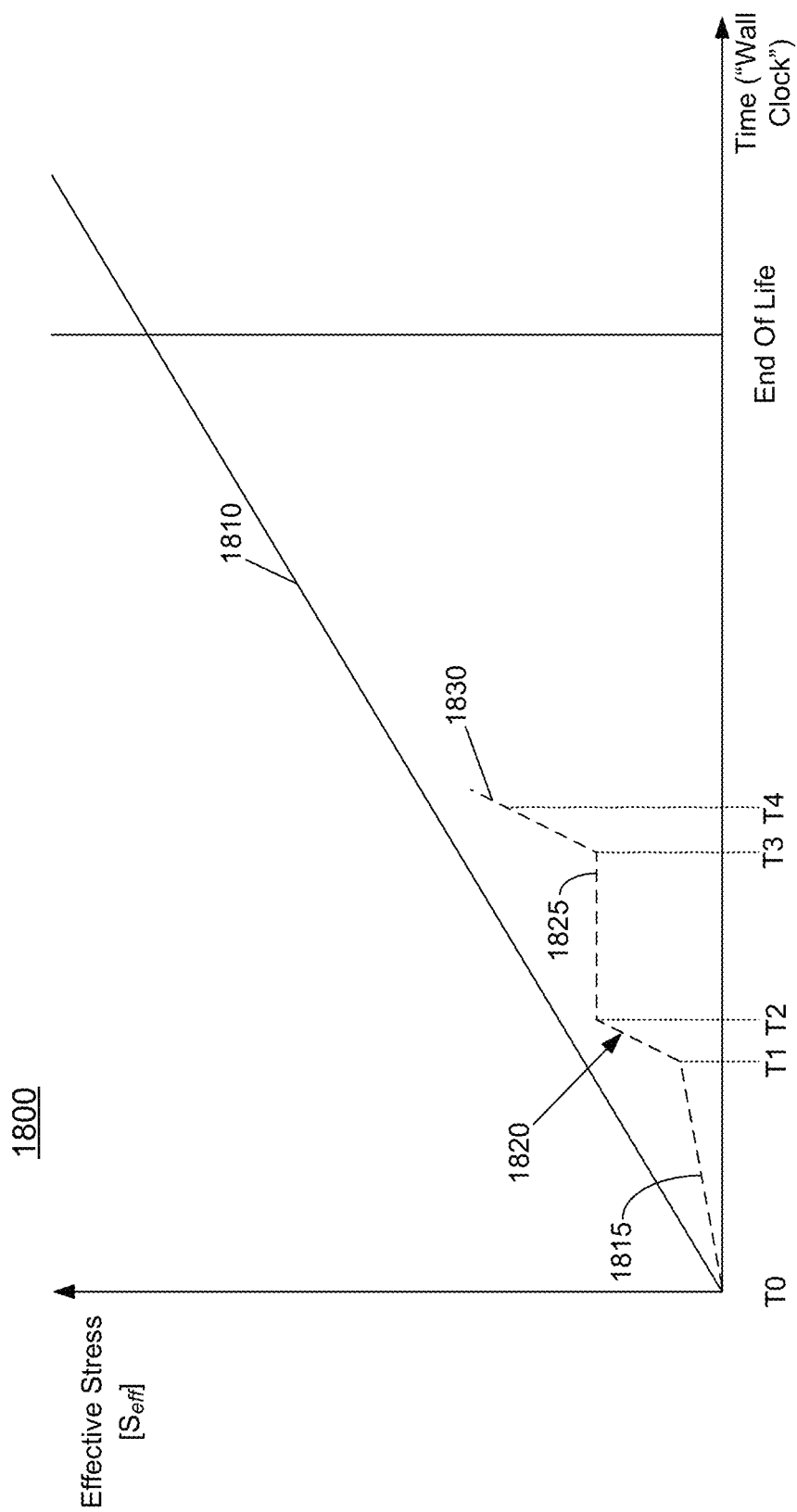
FIG. 18 is a graphical illustration of both a stress model in accordance with an embodiment and actual effective stress for a given processor, calculated as described herein.

Referring now to FIG. 18, shown is a graphical illustration of both a stress model in accordance with an embodiment, and actual effective stress for a given processor, calculated as described herein. More specifically in FIG. 18, a stress model 1810 is configured as a linear model, such that an accumulated stress linearly increases from a beginning of a lifetime of the processor until its end of life. In embodiments, this linear model may be stored in the processor, e.g., within fuse settings or a non-volatile storage. In other cases, the stress model may be stored in a platform storage coupled to the processor. In some cases, the stress model may be implemented as a series of points, e.g., of (x, y) coordinates, such that given a particular wall clock duration, the modeled stress can be determined, e.g., according to an interpolation or other curve fitting technique. In other cases, the model may be stored by way of an equation (e.g., a linear equation), such that the modeled stress for any time duration can be determined based on the wall clock duration and the equation.

Still with reference to FIG. 18, also shown is a curve formed of different linear segments that correspond to effective stress incurred over particular durations of the processor lifetime. As illustrated, the calculated actual stress of the processor begins at an initial value (e.g., 0 at a beginning of life at time T0). Thereafter a first stress segment 1815 occurs between time T0 and time T1, corresponding to a relatively low stress period of operation, given that the calculated effective stress is below the modeled stress level of stress model 1810. This low stress period may be due to, e.g., operation at relatively low temperatures, reduced amount of compute intensive operation, limited actual operation or so forth. Thereafter, for another stress segment 1820, a higher stress period (shown by the steeper slope of segment 1820) occurs. As an example, this high stress period of operation may be due to higher compute-intensive operation with significant amounts of turbo mode operation. Next shown is another stress segment 1825 that has a zero slope value in which no stress is accumulated, e.g., due to the system including the processor being in an off state. As further shown, another stress segment 1830 again incurs a higher stress period. Thus with regard to the above time durations T0-T4, accumulated stress may be lower than an allowed stress (according to stress model 1810) due to off-times, lower load, lower temperatures and so forth. Understand also that the curves of FIG. 18 are not as scale. In embodiments, accumulation and correction (in which turbo budget increases an acceleration rate back to the stress model level) may occur at much finer grain than lifetime of the processor. For example, these accumulation and correction values may be calculated every few seconds. In one embodiment, the lifetime may be measured in years.

Note that in these time durations from T0-T4, the calculated effective stress remains at all times under the corresponding stress model value of stress model 1810. As such, it is possible for turbo mode operation to occur with increased parameters (e.g., higher turbo mode frequency, extended turbo mode duration or so forth). Note that in some instances, such increased turbo mode capability may not occur during an initial phase of a processor's lifetime, until a long-term use case is identified and at least a given margin or headroom between a calculated effective stress and the corresponding stress model value is realized. As an example, increased turbo mode operational capabilities may not be allowed until there is a threshold amount of headroom and/or the processor has been in operation for at least a threshold time period.

Figure 19:
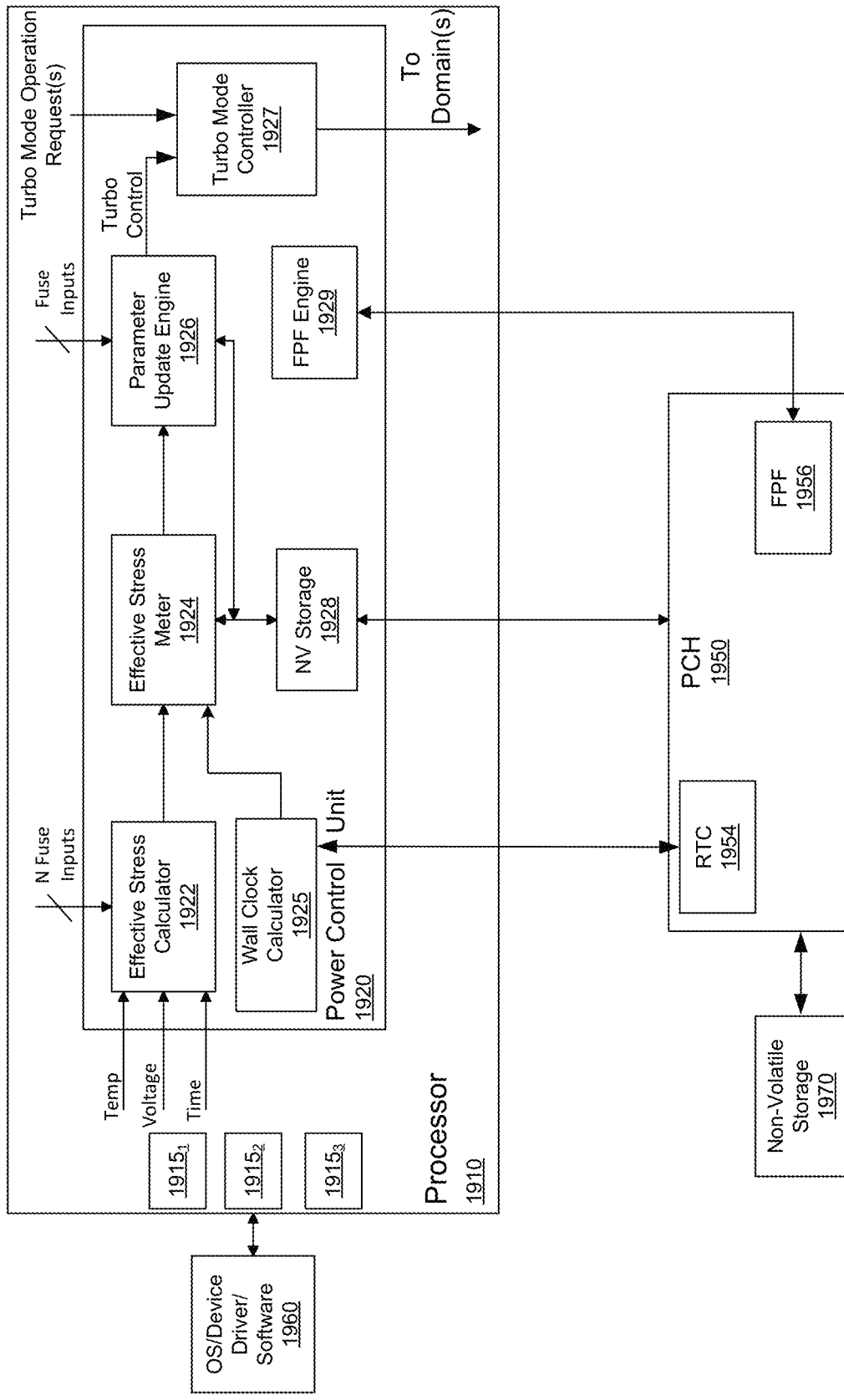
FIG. 19 is a block diagram of a portion of a system in accordance with an embodiment of the present invention.

Referring now to FIG. 19, shown is a block diagram of a portion of a system in accordance with an embodiment of the present invention. As shown in FIG. 19, system 1900 includes a processor 1910 coupled to a PCH 1950. Understand that processor 1910 may be a multicore processor including multiple processor cores, cache memories and other components. Note that in some embodiments system 1900 may be implemented as a SoC in which both processor 1910 and PCH 1950 are configured on a single semiconductor die. In other cases, PCH 1950 may be implemented as a converged security and manageability engine (CSME).

Such CSME may be adapted, in different embodiments, on a single die with a remainder of processor 1910, as a separate die within a multi-chip module, or as a separate integrated circuit. Also understand that for ease of illustration, only limited components are shown in FIG. 19.

As first seen, processor 1910 includes a plurality of domains 1915₁-1915₃. Although the scope of the present invention is not limited in this regard, these independent domains, each of which may include various general-purpose processing units, graphics processing units and/or other processing units each may receive independent power and clock signals and thus may operate at independent operating voltages and operating frequencies. In some embodiments, first domain 1915₁ may be a core domain that includes a plurality of cores. In turn, second domain 1915₂ may be a graphics domain including one or more graphics engines such as graphics processing units. Further, third domain 1915₃ may be an independent domain including, e.g., dedicated processing units such as various fixed function units. Alternately, third domain 1915 may be another core domain, e.g., of an asymmetric core design. For example, as mentioned above in some embodiments a multicore processor may include heterogeneous cores, e.g., in-order cores and out-of-order cores.

As seen, a PCU 1920 is coupled to domains 1915 and may be used to control power consumption within processor 1910. In the embodiment of FIG. 19 PCU 1920 includes an effective stress calculator 1922 that may receive incoming operating parameter information including temperature, voltage and time. In addition, various fused inputs can be received by the calculator. These fused inputs may be a set of constants and/or other coefficients. Based on these values and the incoming operating parameter information, stress calculator 1922 can calculate an effective stress for the current parameters of the processor.

In one embodiment, the effective stress may be determined according to the following equation:

$$S_{eff}(t+dt)=S_{eff}(t)+dt\times AF(v)+AF(T).$$ [Equation 1].

In Equation 1, $S_{eff}$ is the calculated effective stress, t is time (namely a lifetime duration), and dt is a time duration for which an update measurement is to occur. In an embodiment, the effective stress may be calculated and accumulated every millisecond, stored in temporary storage, and at a longer duration (e.g., 5-10 minutes), stored to non-volatile memory. In embodiments, the effective stress may be calculated in units of time and thus may reflect a cumulative amount of stress on the processor, as a function of voltage, temperature and time. In turn, AF(v) and AF(T) are acceleration factors for, respectively, voltage and temperature. Note that voltage and temperature may impact stress exponentially, such that these acceleration factors may also be provided exponentially. Stated another way, time durations of a processor that occur in high voltage and temperature states may induce significantly greater effective stress than lower voltage/temperature states. In embodiments, these acceleration factors may be received as fuse inputs or obtained from another non-volatile storage based on an identified voltage and temperature at which the processor is operating, respectively. As seen in EQ. 1, the calculated effective stress for the update duration is accumulated with the accumulated calculated effective stress previously determined. This effective stress is thus accumulated with a stored effective stress value.

Still with reference to PCU 1920, a wall clock calculator 1925 may be provided. Wall clock calculator 1925 may calculate an actual lifetime of processor 1910, which may be based upon information from a real-time clock (RTC) 1954 of PCH 1950. Note that this wall clock time may be resilient to various operations within a platform, such as resets and so forth. That is, a wall clock time may be a measure of total lifetime duration of a part. In different implementations this wall clock time may be measured from a beginning of lifetime of the processor as manufactured, as incorporated into a platform, as that platform is incorporated into an end user device (such as a vehicle), at a point of sale of that end user device, or so forth. Regardless of the actual point at which lifetime duration begins, the wall clock time that is measured is resilient to resets of various natures, loss of system power, such as by way of car battery service or so forth. Note that the wall clock can be also measured at intervals such as days, month, etc. Stated another way, budgets may be managed at a given interval (e.g., weekly) and not accumulated over a full lifetime.

Note that there may be a bonding process in which the effective stress value is reset at shipment. In other cases as discussed above, the actual lifetime duration may begin at different points in a manufacturing/sale chain. For example, in some cases a reliability odometer may begin operation upon manufacture of the integrated circuit, but be reset when incorporated into a final end product.

As illustrated, the determined wall clock time in turn may be provided to effective stress meter 1924. In embodiments, meter 1924 may be implemented as a hardware circuit, firmware, software, and/or combinations thereof to identify, based upon the determined wall clock time (actual lifetime), a corresponding stress model value. As seen, stress meter 1924 is coupled to a non-volatile storage 1928 that can store the accumulated effective stress value and possibly the stress model. In addition, the calculated accumulated effective stress calculated in effective stress calculator 122 also may be provided to meter 1924. As such, meter 1924 also may identify whether there is stress headroom. Namely, meter 1924 may determine whether the calculated accumulated effective stress is less than the corresponding stress model value. If so, meter 1924 can send an indication to parameter update engine 1926. As seen, update engine 1926 may further receive a plurality of fused inputs, which may correspond to various coefficients and/or constants that can be used by the update engine to thus calculate one or more operating parameters based on the accumulated effective stress level.

Update engine 1926, in the instance where the calculated accumulated effective stress is indicated to be less than the corresponding stress model value, may provide parameters for increased turbo mode operation including, for example, increased turbo mode frequency voltage and/or turbo mode duration. These updated parameters may be provided to a turbo mode controller 1927 as one or more turbo mode control signals. In turn, based on these values, additional configuration values and further based on incoming requests for turbo mode operation, turbo mode controller 1927 can identify appropriate turbo mode parameters including frequency, voltage and duration. These parameters may be communicated to processor-internal clock and voltage control circuitry to effect frequency/voltage updates to cores and other processor circuitry. Note that the turbo mode requests may be received from software such as applications and/or an operating system that executes on processor 1910. Turbo mode controller 1927 may limit turbo mode operation in constrained environments, such as when there is insufficient power and/or thermal headroom.

Non-volatile memory 1928 may also store code that can be executed by one or more of stress calculator 1922, stress meter 1924, wall clock calculator 1925, and update engine 1926. Generally, all of the components shown in PCU 1920 may be considered to be a stress detector that can be implemented by any combination of logic including hardware circuitry, software, firmware and/or combinations thereof.

As further illustrated, PCU 1950 may include a field programmable fuse engine 1929 that may act as an interface to provide fuse values, which may be stored either within non-volatile storage 1928 or within a field programmable fuse array 1956 of PCH 1950. Although the scope of the present invention is not limited in this regard, in an embodiment such values may include parameters of the stress model, one or more stress equations and so forth.

Still referring to FIG. 19, various software 1960 may communicate with processor 1910 (e.g., to or from one or more of domains 1915$_1$-1915$_3$ and/or PCU 1920). Such software may include one or more of an OS, one or more device drivers and various platform level software such as BIOS or other system software. Still further, using embodiments as described herein, this and other software (such as application software) may be configured to issue requests for turbo mode operation, requests for lower power operation, among other requests to be handled within PCU 1920.

To enable maintenance of such reliability information as described herein (and potentially enable its communication to external entities), an interface may couple to PCH 1950 to enable the various lifetime statistical information stored in non-volatile storage 1928 to be communicated for storage in non-volatile storage 1970. In some cases, via this storage, reliability and other platform information may be communicated to a given entity, e.g., via a data center or cloud service provider context. Still further, when the reliability information exceeds a given threshold, an indication light may be illuminated on an instrument panel to denote it is time to perform scheduled maintenance, like a car oil change. Although shown at this high level in the embodiment of FIG. 19, understand that other components may be used to perform a stress analysis in accordance with an embodiment of the present invention. In addition, other logic such as scheduling logic may be present within processor 1910 to schedule workloads to the various processing agents of the processor.

Figure 20A:
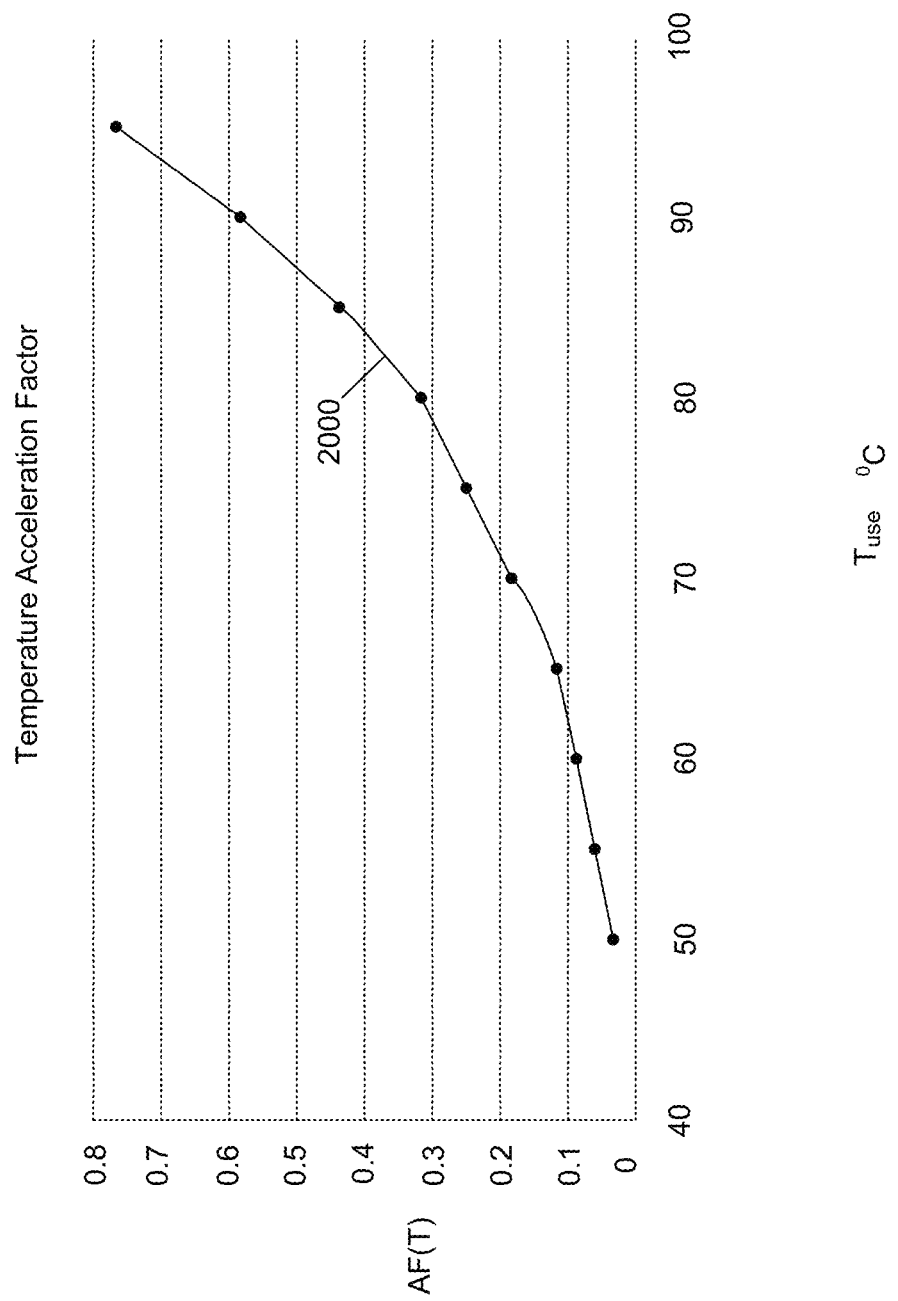
FIG. 20A is a graphical illustration of a temperature acceleration factor in accordance with an embodiment of the present invention.

Referring now to FIG. 20A, shown is a graphical illustration of a temperature acceleration factor in accordance with an embodiment. As shown in FIG. 20A, curve 2100 is a curve of temperature acceleration factors, that shows the exponential nature of this factor. As seen, at low temperatures, a relatively low acceleration factor is present, while as temperature increases, the acceleration factor increases exponentially. The acceleration factors may be stored in a non-volatile storage accessible to an effective stress calculator.

Given the exponential dependency in temperature, the difference in stress between operation at 90° C. and 95° C. may be more than 30%. Note that when this exponential stress is translated to a linear dependency in time (according to Equation 1 above) time may extend significantly.

Figure 20B:
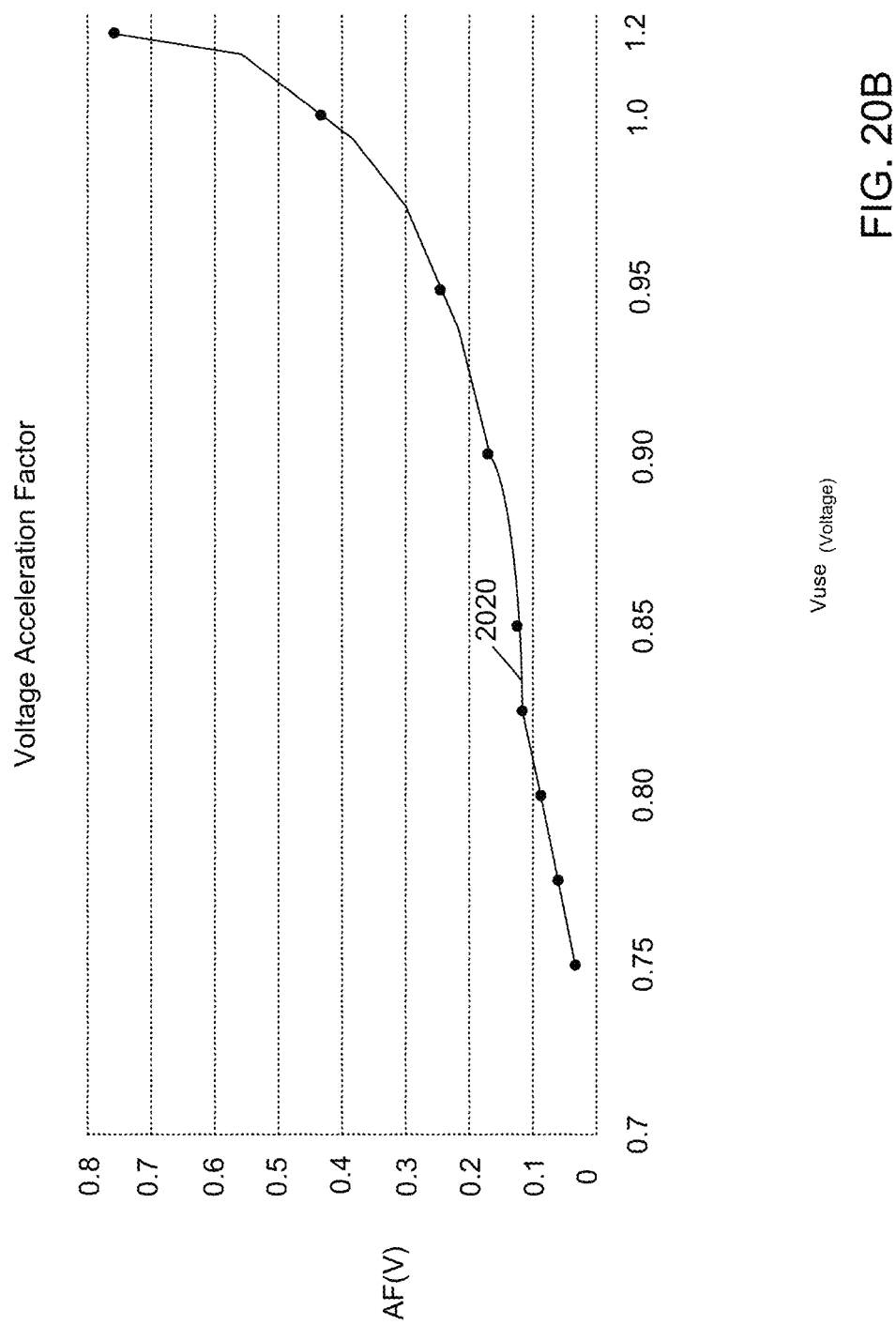
FIG. 20B is a graphical illustration of a voltage acceleration factor in accordance with an embodiment of the present invention.

Similarly, FIG. 20B shows a graphical illustration of a voltage acceleration factor in accordance with an embodiment. As shown in FIG. 20B, curve 2020 is a curve of voltage acceleration factors, that shows the exponential nature of this factor. As seen, at low voltages, a relatively low acceleration factor is present, while as voltage increases, the acceleration factor increases exponentially. The acceleration factors may be stored in a non-volatile storage accessible to an effective stress calculator.

Using embodiments herein, a processor may be designed for worst case usage situations, namely a worst case user, usage model and environmental conditions. Nevertheless, with configured base values according to this worst case situation, increased capabilities may be realized for the large percentage of users that do not operate at these worst case situations.

Figure 21:
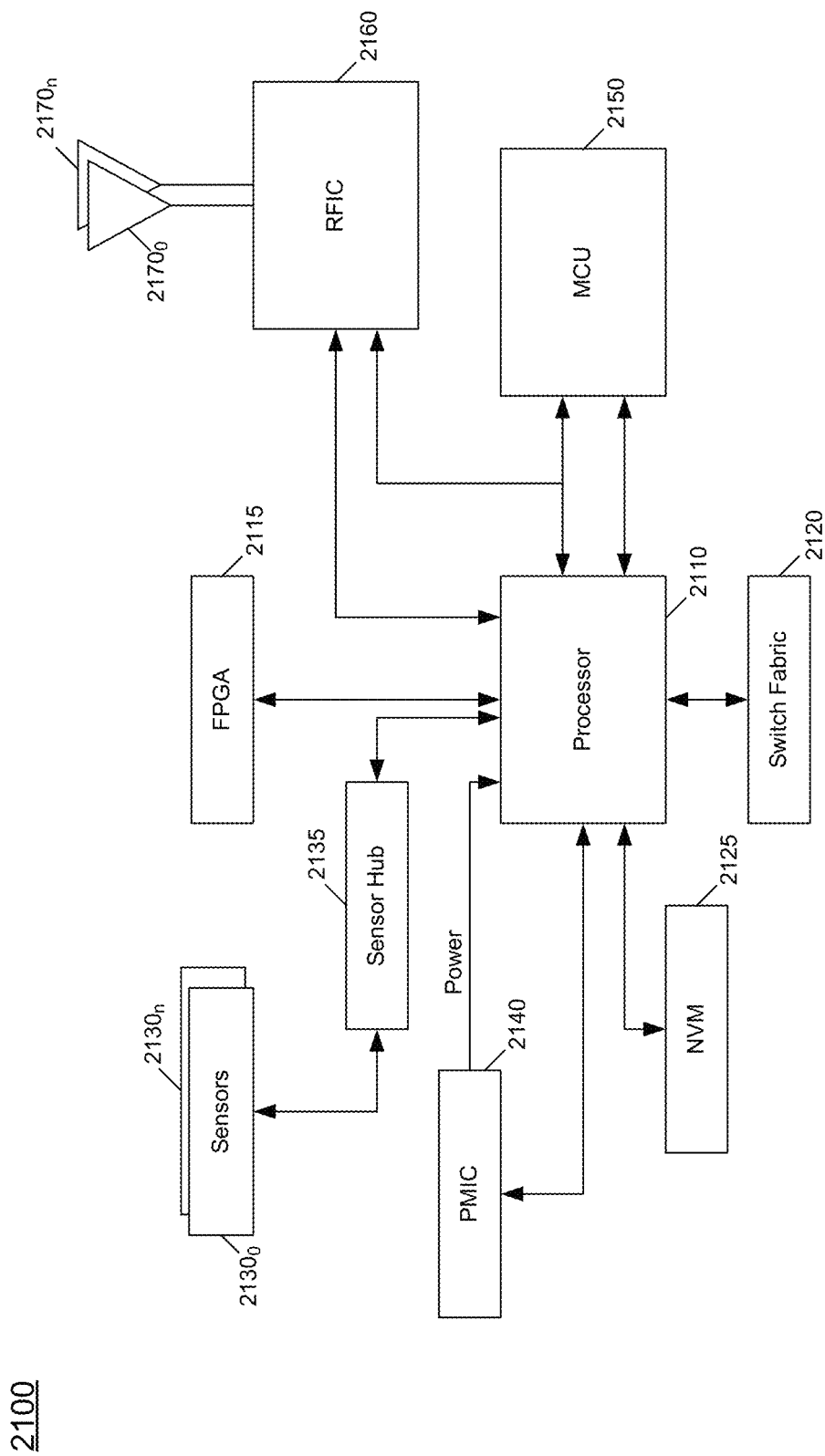
FIG. 21 is a block diagram of a system in accordance with another embodiment of the present invention.

As discussed above, embodiments enable reliability information to be used in a wide variety of processors and other SoCs that can be incorporated into many different platforms. Of particular relevance herein, such platforms may be different types of IoT systems, where these systems can be operated in many different types of environments. In embodiments, potential headroom may be available for higher or more aggressive execution when a calculated effective stress is less than a corresponding stress model value. One example IoT platform is an autonomous vehicle computing system, which may take different forms as such system is incorporated into different vehicle types. Referring now to FIG. 21, shown is a block diagram of a system in accordance with another embodiment of the present invention. In the embodiment of FIG. 21, system 2100 is an autonomous driving vehicle computing system. As such, system 2100 may be implemented within a vehicle that provides for some level of autonomous driving. Understand that with different levels of autonomous driving control, different levels of workloads may be executed within system 2100 to perform some or all driving tasks autonomously.

As illustrated, system 2100 includes a processor 2110, which may be a general-purpose multicore processor or other SoC. In different implementations, multiple such processors may be implemented to flexibly allocate autonomous driving workloads across these processors. Processor 2110 may include a plurality of cores that may operate at dynamically controllable frequencies and/or voltages. Furthermore as described herein in response to received turbo mode requests, a power controller within processor 2110 may enable turbo mode operation, assuming the processor is not operating in a constrained environment. Furthermore as discussed herein for such turbo mode operation, the power controller may enable one or more cores or other processing circuits to operate at higher turbo mode frequencies when it is determined that an effective stress over a given lifetime of processor 2110 is less than a corresponding stress model value for the indicated lifetime duration. And by the same token, when the power controller determines that the calculated effective stress for the lifetime duration exceeds the corresponding stress model value, turbo mode operation may be more tightly controlled. For example in some cases, turbo mode operation may be prevented. In yet other cases, such turbo mode operation may occur at lower turbo mode frequencies, as described above. Processor 2110 receives power that is controlled by a power management integrated circuit (PMIC) 2140. Turbo mode requests may be received during times of high computing workloads such as for user-visible workloads, receipt and processing of sensor information, autonomous driving workloads and so forth.

System 2100 may further include one or more field programmable gate arrays (FPGAs) 2115 or other programmable accelerators to which certain autonomous driving workloads may be offloaded. Processor 2110 further couples to a non-volatile memory 2125, which in an embodiment may be implemented as a flash memory. To provide communication with other components within a vehicle, processor 2110 further couples to a switch fabric 2120 which in an embodiment may be implemented as an Ethernet switch fabric that in turn may couple to other components within a vehicle, including display components, vehicle infotainment systems, and so forth. Still further, switch fabric 2120, which may take the form of any type of interface or communication circuit, may also provide control information to various vehicle actuators. For examples, based at least in part on analysis of environmental and image information received from a plurality of sensors 2130 (discussed further below), cores or other processing circuits within processor 2010 and/or FPGA 2215 may generate control signals to be provided to vehicle actuators including an acceleration actuator, a braking actuator, steering actuators, among many other types of actuators. Still further, processor 2110 (and switch fabric 2120) also couple to a microcontroller 2150, which may control various operations within system 2100.

Furthermore, to enable interaction with other systems, including other vehicles, roadway systems, over-the-air update sources, infotainment content sources, sensor data communication and so forth, processor 2110 and MCU 2150 may couple to one or more radio frequency integrated circuits (RFICs) 2160. In embodiments, RFIC 2160 may be configured to support 5G-based specifications for communication of automotive and other data via a variety of wireless networks. To this end, RFIC 2160 may couple to one or more antennas $2170_0$-$2170_n$ of a vehicle.

As further illustrated in FIG. 21, system 2100 may include a plurality of sensors $2130_0$-$2130_n$ that provide sensor information, via a sensor hub 2135 to processor 2110. Although the scope of the present invention is not limited in this regard in embodiments, such sensors may include lidar, ultrasound, radar and optical sensors, among other sensor types. Sensor hub 2135 may be configured to fuse at least some of this data to provide information regarding the vehicle's surroundings, for provision to processor 2110. In turn, processor 2110 and/or FPGA 2115 may use this fused sensor information in connection with performing autonomous driving workloads. For example, a processing circuit within processor 2010 and/or FPGA 2115 may identify an action to be taken, such as one or more of acceleration, braking and/or steering updates. Based upon such determinations, control signals may be provided via switch fabric 2120 to corresponding actuators of the vehicle to enable such changes in operation to occur. Understand while shown at this high level in the embodiment of FIG. 21, many variations and alternatives are possible.

The following examples pertain to further embodiments.

In one example, a processor comprises: at least one core; a stress detector coupled to the at least one core to receive at least one of a voltage and a temperature at which the processor is to operate, calculate an effective stress based at least in part thereon, and maintain an accumulated effective stress; a clock circuit to calculate a lifetime duration of the processor in a platform; a meter to receive the accumulated effective stress, the lifetime duration and a stress model value and generate a control signal based on a comparison of the accumulated effective stress and the stress model value; and a power controller to control at least one parameter of a turbo mode of the processor based at least in part on the control signal.

In an example, the power controller is to enable the at least one core to operate at an increased turbo mode frequency when the accumulated effective stress is less than the stress model value.

In an example, the meter is to obtain the stress model value from a stress model based at least in part on the lifetime duration, the stress model value associated with the lifetime duration.

In an example, the processor further comprises a non-volatile storage to store the stress model.

In an example, the stress detector is to calculate the effective stress further based on a first acceleration factor and a second acceleration factor, the first acceleration factor based on the temperature, the second acceleration factor based on the voltage.

In an example, the non-volatile storage is to store a set of first acceleration factors, each of the set of first acceleration factors associated with a temperature, the non-volatile storage further to store a set of second acceleration factors, each of the set of second acceleration factors associated with a voltage.

In an example, the processor is incorporated in a platform comprising a vehicular computing system, and the processor is to receive a turbo mode request in response to activation of one or more image sensors of the vehicular computing system.

In an example, the clock circuit is to calculate the lifetime duration based on a value of a real-time clock.

In an example, the meter is to generate the control signal in response to the accumulated effective stress being less than the stress model value.

In another example, a method comprises: receiving a voltage and a temperature of a SoC in a controller of the SoC; calculating an effective stress of the SoC based at least in part on the voltage and the temperature; accumulating the calculated effective stress with a stored effective stress corresponding to a history of the effective stress of the SoC over a lifetime duration of the SoC to obtain an accumulated effective stress of the SoC; receiving a real-time clock value in the controller and calculating the lifetime duration of the processor based at least in part thereon; obtaining a stress model value from a stress model based at least in part on the lifetime duration; comparing the accumulated effective stress to the stress model value; and enabling the SoC to operate at a first turbo mode frequency if the accumulated effective stress is less than the stress model value, and enabling the SoC to operate at a second turbo mode frequency less than the first turbo mode frequency if the accumulated effective stress exceeds the stress model value.

In an example, the method further comprises calculating the effective stress further based on a first acceleration factor and a second acceleration factor, the first acceleration factor based on the temperature, the second acceleration factor based on the voltage.

In an example, the method further comprises using the temperature to obtain the first acceleration factor from a non-volatile storage and using the voltage to obtain the second acceleration factor from the non-volatile storage.

In an example, the method further comprises receiving a turbo mode request in the SoC in response to execution of a user-visible workload, and enabling at least one core to operate at an increased turbo mode frequency when a thermal headroom is available.

In an example, the method further comprises updating the accumulated effective stress in response to a temperature change of the SoC that exceeds a temperature threshold.

In an example, the second turbo mode frequency comprises a base turbo mode frequency, and the first turbo mode frequency comprises one or more bin frequencies greater than the base turbo mode frequency.

In an example, the method further comprises preventing the SoC from operation at the first turbo mode frequency until the lifetime duration exceeds a first time duration.

In an example, the method further comprises bonding the SoC to a vehicular computing system to maintain the lifetime duration over a plurality of reset events of the vehicular computing system.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In a further example, a system has a SoC including: a plurality of cores to execute instructions; a stress detection circuit coupled to the plurality of cores to receive at least one of a voltage and a temperature of the SoC, calculate an effective stress based at least in part on the at least one of the voltage and the temperature, and accumulate the effective stress with a stored effective stress to obtain an accumulated effective stress; a clock calculation circuit to calculate a lifetime duration of the system; a control circuit to compare the accumulated effective stress to a stress model value for the lifetime duration; and a power controller to enable the SoC to operate at a first turbo mode frequency in response to a turbo mode request when the accumulated effective stress is less than the stress model value and enable the SoC to operate at a second turbo mode frequency in response to the turbo mode request when the accumulated effective stress exceeds the stress model value, the second turbo mode frequency lower than the first turbo mode frequency. The system may further include a plurality of sensors coupled to SoC to provide environmental information and image information to the SoC, where at least one of the plurality of cores is to determine an action to taken by an actuator based at least in part on one or more of the environmental information and the image information. The system may also include a communication circuit to provide control information regarding the action to the actuator.

In an example, the system further comprises a non-volatile storage to store a stress model, the stress model comprising a linear model to enable the stress model value to be determined based on the lifetime duration.

In an example, the stress detection circuit is to calculate the effective stress further based on a first acceleration factor and a second acceleration factor, the first acceleration factor based on the temperature, the second acceleration factor based on the voltage, the SoC to store a set of first acceleration factors and a set of second acceleration factors, each of the set of first acceleration factors associated with a temperature and each of the set of second acceleration factors associated with a voltage.

In an example, the communication circuit is to send information regarding the accumulated effective stress to an external agent based at least in part on a level of the accumulated effective stress.

In another example, an apparatus comprises: at least one core means; stress detector means coupled to the at least one core means for receiving at least one of a voltage and a temperature at which the apparatus is to operate, calculating an effective stress based at least in part thereon, and maintaining an accumulated effective stress; clock means for calculating a lifetime duration of the apparatus in a platform; metering means for receiving the accumulated effective stress, the lifetime duration and a stress model value and generating a control signal based on a comparison of the accumulated effective stress and the stress model value; and power control means for controlling at least one parameter of a turbo mode of the apparatus based at least in part on the control signal.

In an example, the power control means is to enable the at least one core means to operate at an increased turbo mode frequency when the accumulated effective stress is less than the stress model value.

In an example, the metering means is to obtain the stress model value from a stress model based at least in part on the lifetime duration, the stress model value associated with the lifetime duration.

In an example, the apparatus further comprises non-volatile storage means for storing the stress model.

In an example, the stress detector means is to calculate the effective stress further based on a first acceleration factor and a second acceleration factor, the first acceleration factor based on the temperature, the second acceleration factor based on the voltage.

In an example, the non-volatile storage means is to store a set of first acceleration factors, each of the set of first acceleration factors associated with a temperature, the non-volatile storage further to store a set of second acceleration factors, each of the set of second acceleration factors associated with a voltage.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   at least one core;
   a stress detector coupled to the at least one core to receive at least one of a voltage and a temperature at which the processor is to operate, calculate an effective stress based at least in part thereon, and maintain an accumulated effective stress;
   a clock circuit to calculate an elapsed lifetime duration of the processor in a platform, wherein the elapsed lifetime duration is a sum of a total active time of the processor and a total inactive time of the processor, the total inactive time comprising time in which the processor is in a power-off state;
   a meter to receive the accumulated effective stress, obtain a stress model value from a stress model based at least in part on the elapsed lifetime duration, and generate a control signal based on a comparison of the accumulated effective stress and the stress model value; and
   a power controller to control at least one parameter of a turbo mode of the processor based at least in part on the control signal.

2. The processor of claim 1, wherein the power controller is to enable the at least one core to operate at an increased turbo mode frequency when the accumulated effective stress is less than the stress model value.

3. The processor of claim 1, wherein the stress model comprises a linear equation of stress as a function of time.

4. The processor of claim 3, further comprising a non-volatile storage to store the stress model.

5. The processor of claim 4, wherein the stress detector is to calculate the effective stress further based on a first acceleration factor and a second acceleration factor, the first acceleration factor based on the temperature, the second acceleration factor based on the voltage.

6. The processor of claim 5, wherein the non-volatile storage is to store a set of first acceleration factors, each of the set of first acceleration factors associated with a temperature, the non-volatile storage further to store a set of second acceleration factors, each of the set of second acceleration factors associated with a voltage.

7. The processor of claim 1, wherein the processor is incorporated in a platform comprising a vehicular computing system, and wherein the processor is to receive a turbo mode request in response to activation of one or more image sensors of the vehicular computing system.

8. The processor of claim 1, wherein the clock circuit is to calculate the elapsed lifetime duration based on a value of a real-time clock.

9. The processor of claim 1, wherein the meter is to generate the control signal in response to the accumulated effective stress being less than the stress model value.

10. A machine-readable medium having stored thereon instructions, which if performed by a machine cause the machine to perform a method comprising:
    receiving a voltage and a temperature of a system on chip (SoC) in a controller of the SoC;
    calculating an effective stress of the SoC based at least in part on the voltage and the temperature;
    accumulating the calculated effective stress with a stored effective stress corresponding to a history of the effective stress of the SoC over an elapsed lifetime duration of the SoC to obtain an accumulated effective stress of the SoC;
    receiving a real-time clock value in the controller and calculating the elapsed lifetime duration of the processor based at least in part thereon, wherein the elapsed lifetime duration is a sum of a total active time of the SoC and a total inactive time of the SoC, the total inactive time comprising time in which the SoC is in a power-off state;
    obtaining a stress model value from a stress model based at least in part on the elapsed lifetime duration;
    comparing the accumulated effective stress to the stress model value; and
    enabling the SoC to operate at a first turbo mode frequency if the accumulated effective stress is less than the stress model value, and enabling the SoC to operate at a second turbo mode frequency less than the first turbo mode frequency if the accumulated effective stress exceeds the stress model value.

11. The machine-readable medium of claim 10, wherein the method further comprises calculating the effective stress further based on a first acceleration factor and a second acceleration factor, the first acceleration factor based on the temperature, the second acceleration factor based on the voltage.

12. The machine-readable medium of claim 11, wherein the method further comprises using the temperature to obtain the first acceleration factor from a non-volatile storage and using the voltage to obtain the second acceleration factor from the non-volatile storage.

13. The machine-readable medium of claim 10, wherein the method further comprises receiving a turbo mode request in the SoC in response to execution of a user-visible workload, and further comprising enabling at least one core to operate at an increased turbo mode frequency when a thermal headroom is available.

14. The machine-readable medium of claim 10, wherein the method further comprises updating the accumulated effective stress in response to a temperature change of the SoC that exceeds a temperature threshold.

15. The machine-readable medium of claim 10, wherein the second turbo mode frequency comprises a base turbo mode frequency, and the first turbo mode frequency comprises one or more bin frequencies greater than the base turbo mode frequency.

16. The machine-readable medium of claim 15, wherein the method further comprises preventing the SoC from operation at the first turbo mode frequency until the elapsed lifetime duration exceeds a first time duration.

17. The machine-readable medium of claim 10, wherein the method further comprises bonding the SoC to a vehicular computing system to maintain the elapsed lifetime duration over a plurality of reset events of the vehicular computing system.

18. A system comprising:
    a system on chip (SoC) including:
      a plurality of cores to execute instructions;
      a stress detection circuit coupled to the plurality of cores to receive at least one of a voltage and a temperature of the SoC, calculate an effective stress based at least in part on the at least one of the voltage and the temperature, and accumulate the effective stress with a stored effective stress to obtain an accumulated effective stress;

a clock calculation circuit to calculate an elapsed lifetime duration of the system, wherein the elapsed lifetime duration is a sum of a total active time of the system and a total inactive time of the system, the total inactive time comprising time in which the system is in a power-off state;

a control circuit to determine a stress model value from a stress model based at least in part on the elapsed lifetime duration, and to compare the accumulated effective stress to the determined stress model value; and a power controller to enable the SoC to operate at a first turbo mode frequency in response to a turbo mode request when the accumulated effective stress is less than the stress model value and enable the SoC to operate at a second turbo mode frequency in response to the turbo mode request when the accumulated effective stress exceeds the stress model value, the second turbo mode frequency lower than the first turbo mode frequency;

a plurality of sensors coupled to SoC to provide environmental information and image information to the SoC, wherein at least one of the plurality of cores is to determine an action to taken by an actuator based at least in part on one or more of the environmental information and the image information; and a communication circuit to provide control information regarding the action to the actuator.

19. The system of claim 18, further comprising a non-volatile storage to store the stress model, the stress model comprising an equation of stress as a function of time.

20. The system of claim 18, wherein the stress detection circuit is to calculate the effective stress further based on a first acceleration factor and a second acceleration factor, the first acceleration factor based on the temperature, the second acceleration factor based on the voltage, the SoC to store a set of first acceleration factors and a set of second acceleration factors, each of the set of first acceleration factors associated with a temperature and each of the set of second acceleration factors associated with a voltage.

21. The system of claim 18, wherein the communication circuit is to send information regarding the accumulated effective stress to an external agent based at least in part on a level of the accumulated effective stress.

\* \* \* \* \*